United States Patent
Mizoguchi et al.

(10) Patent No.: US 10,430,136 B2
(45) Date of Patent: Oct. 1, 2019

(54) MULTIFUNCTIONAL IMAGE PROCESSING APPARATUS

(71) Applicants: Yoshihiro Mizoguchi, Osaka (JP); Atsushi Kurimoto, Osaka (JP)

(72) Inventors: Yoshihiro Mizoguchi, Osaka (JP); Atsushi Kurimoto, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 85 days.

(21) Appl. No.: 14/597,945

(22) Filed: Jan. 15, 2015

(65) Prior Publication Data
US 2016/0210095 A1 Jul. 21, 2016
US 2017/0308342 A9 Oct. 26, 2017

Related U.S. Application Data

(62) Division of application No. 13/475,627, filed on May 18, 2012, now Pat. No. 8,953,183.

(30) Foreign Application Priority Data

May 20, 2011 (JP) ................................ 2011-113129

(51) Int. Cl.
  *H04N 1/00* (2006.01)
  *G06F 3/12* (2006.01)
  *H04N 1/44* (2006.01)

(52) U.S. Cl.
  CPC .......... *G06F 3/1271* (2013.01); *G06F 3/1238* (2013.01); *H04N 1/00411* (2013.01);
  (Continued)

(58) Field of Classification Search
  CPC .... G06F 3/1271; G06F 3/1238; G06F 3/1206; G06F 3/1287; G06F 3/128; G06F 3/1247;
  (Continued)

(56) References Cited

U.S. PATENT DOCUMENTS 5,878,302 A * 3/1999 Inui ........................ G03G 15/70
  345/40
6,299,364 B1 10/2001 Maruta et al.
  (Continued)

FOREIGN PATENT DOCUMENTS

CN 101039369 A 9/2007
CN 101115116 A 1/2008
  (Continued)

*Primary Examiner* — Kent Yip
(74) *Attorney, Agent, or Firm* — Birch, Stewart, Kolasch & Birch, LLP

(57) ABSTRACT

A multifunctional image forming apparatus includes: a communication device communicable with a server providing a service related to image formation with the user; a display operation device having a display function, for receiving a user operation; and an image forming unit for forming an image in response to a user instruction received through the display operation device. The multifunctional image forming apparatus receives an input operation by the user through the display operation device, displays a screen in accordance with the input operation and, in addition, executes a user registration process for the service provided by the server through communication with the server through the communication device, and displays a screen thereof.

8 Claims, 30 Drawing Sheets

(52) U.S. Cl.
CPC ....... *H04N 1/00413* (2013.01); *H04N 1/4426* (2013.01); *H04N 1/4433* (2013.01); *G06F 3/1206* (2013.01); *G06F 3/128* (2013.01); *G06F 3/1247* (2013.01); *G06F 3/1287* (2013.01); *H04N 2201/0094* (2013.01)

(58) Field of Classification Search
CPC ........ G06F 2221/2117; H04N 1/00411; H04N 1/00413; H04N 2201/0094; H04N 1/4433; H04N 1/4426
USPC .............................................. 358/1.13, 1.15
See application file for complete search history.

(56) References Cited

U.S. PATENT DOCUMENTS

| | | | |
|---|---|---|---|
| 2002/0036798 | A1 | 3/2002 | Sumiyama et al. |
| 2004/0215671 | A1* | 10/2004 | Hyakutake ........ G06F 17/30011 |
| 2006/0149832 | A1 | 7/2006 | Tanaka et al. |
| 2007/0220425 | A1 | 9/2007 | Matulic |
| 2008/0027569 | A1* | 1/2008 | Okigami ............ H04N 1/00222 |
| | | | 700/83 |
| 2009/0009780 | A1 | 1/2009 | Hayashi et al. |
| 2009/0086261 | A1 | 4/2009 | Irino |
| 2009/0207440 | A1 | 8/2009 | Kaneko et al. |
| 2009/0219568 | A1 | 9/2009 | Machida |
| 2010/0053687 | A1* | 3/2010 | Matsuda ............ H04N 1/00244 |
| | | | 358/3.24 |
| 2011/0063667 | A1 | 3/2011 | Nishida |
| 2011/0194153 | A1 | 8/2011 | Takahata |
| 2011/0216341 | A1 | 9/2011 | Moro |
| 2011/0261388 | A1* | 10/2011 | Tsujimoto ............... H04L 63/08 |
| | | | 358/1.14 |

FOREIGN PATENT DOCUMENTS

| | | |
|---|---|---|
| JP | 11-95938 A | 4/1999 |
| JP | 2001-312388 A | 11/2001 |
| JP | 2001-326742 A | 11/2001 |
| JP | 2002-359709 A | 12/2002 |
| JP | 2003-108343 A | 4/2003 |
| JP | 2004-159184 A | 6/2004 |
| JP | 2005-129007 A | 5/2005 |
| JP | 2005-267002 A | 9/2005 |
| JP | 2007-72653 A | 3/2007 |
| JP | 2009-181171 A | 8/2009 |

* cited by examiner

MULTIFUNCTIONAL IMAGE PROCESSING APPARATUS

CROSS-REFERENCE TO RELATED APPLICATION

This application is a Divisional of co-pending U.S. patent application Ser. No. 13/475,627 filed on May 18, 2012 which application claims priority under 35 U.S.C. § 119(a) on Patent Application No. 2011-113129 filed in Japan on May 20, 2011, the entire contents of which are hereby incorporated by reference.

BACKGROUND OF THE INVENTION

Field of the Invention

The present invention relates to a network print system including a server generating print data from electronic data received from a client apparatus (hereinafter simply referred to as a client) and an image forming apparatus printing the print data. More specifically, the present invention relates to a multifunctional image forming apparatus used in the network print system that can save user's troubles in the process of transmitting electronic data from the client and in the process of printing by the image forming apparatus.

Description of the Background Art

Recently, provision of a system called network print system is becoming popular. In the network print system, a user uploads electronic data to a network print server (print data generation server) provided on the Internet, and requests generation of the print data. Then, the user downloads the print data from the server to an image forming apparatus installed at a public space such as a convenience store and has the data printed.

Using such a system, it becomes possible for an individual not having a printer to print high-quality documents. Therefore, rapid-spread of the system use was expected. Actually, however, penetration of the system is very late. Possible reasons are as follows.

In order to use such service, it is necessary for the user to register a document file with the server. In addition, in order to fully utilize the services provided by the system, it is necessary to have user registration before using the services. The registration procedure takes some time and, therefore, a busy user tends to avoid such trouble.

As a solution to such a problem, Japanese Patent Laying-Open No. 2005-129007 (hereinafter referred to as '007 Reference) discloses a system in which, though user authentication is required when using a print server, a portable memory connectable to a client is provided and necessary pieces of information required for user authentication are all contained in the portable memory. Since user authentication takes place every time the user uses the print server, the print server can manage electronic data user by user. When the user accesses the print server from an image forming apparatus installed at a convenient store or the like, the user authentication also takes place using the same portable memory. The print server is capable of displaying a list of print data related only to the user on the image forming apparatus. The user can select the print data generated by the print server and have the data printed, by the similar procedure as when he/she selects a document using a general personal computer.

Though the system described in '007 Reference can save the trouble of log-in process after user registration, user registration itself must be done in the same manner as before. Therefore, the scheme proposed by '007 Reference is not effective to encourage users who has difficulty to make time for user registration to use the system.

Recently, as a system similar to the print service described above, a service referred to as cloud service has come to be popular. In the cloud service, data that has been saved in the user's own computer is saved in a server on the Internet, data that has been saved in the server on the Internet is printed, or an application stored in the server on the Internet is executed on a local computer. Therefore, wider use of the system is expected in the future. In order to use the cloud service, user registration is indispensable. Therefore, problems related to user registration for the print service as described above also arise in relation to the cloud service. In this regard, the print service can be considered as one type of cloud service.

SUMMARY OF THE INVENTION

Therefore, it is preferable to provide a multifunctional image forming apparatus enabling easier user registration for a remote service.

The present invention provides a multifunctional image forming apparatus (hereinafter referred to as an MFP) including: a communication device configured to enable a registered user to communicate with a server providing a service related to image formation; a display operation device having a display device, for receiving a user operation; and an image forming device configured to execute image formation in response to a user instruction received through the display operation device. The MFP is characterized in that a user registration process for the service provided by the server is executed by communicating with the server through the communication device, upon reception of an input operation by the user through the display operation device.

User registration for a specific service can be done using the display operation device of the MFP. In order to have the user registration for the specific service, it is unnecessary for the user to search for a specific web page or to input specific URL for user registration on the user's own PC. By the MFP used for image formation, user registration for the specific service can be done easily.

Preferably, in the MFP, the user registration process is started when the user starts a process different from the user registration process, by the display operation device.

When the user starts a process different from the user registration process on the MFP, the user registration process starts. It is unnecessary for the user to intentionally start the user registration process. By way of example, user registration can be done using spare time such as the wait time for the print from a file by the MFP.

Preferably, the MFP further includes a connecting device allowing detachable connection of a portable external storage device, and the user registration process is started in response to a user instruction received through the display operation device to print a file saved in the external storage device connected to the connecting device.

If a file is stored in the external storage device and printing of the file is to be done by the multifunctional image forming apparatus, printing takes some time. Therefore, by starting the user registration process in such a situation where execution of such a process is expected, it becomes possible to complete user registration effectively utilizing the spare time.

Preferably, the MFP further includes: a connecting device allowing detachable connection of a portable external storage device; and a document reading device reading an image on a document and outputting document data. The user registration process is started in response to an instruction to save document data output by the document reading device reading the document, in the external storage device connected to the connecting device, from the display operation device.

When the multifunctional image forming apparatus is provided with the document reading device, reading of a document takes some time. By executing the user registration process utilizing this time period, it becomes possible for the user to complete user registration for using the service, effectively using the time.

Preferably, in the MFP, display of a state of image formation by the image forming apparatus and a user registration screen for the service are both displayed on the display operation device.

Preferably, the MFP further includes a connection device to which a portable external storage device can be detachably connected, and in response to completion of the user registration process, information assisting access to the service is registered in the external storage device connected to the connecting device.

When user registration is completed, a piece of information assisting access is registered in the external device. Access to the service next time is made easier by this piece of information.

Preferably, the MFP starts the user registration process for the service if a specific instruction is given by the user, and does not start the user registration process if other instruction is given by the user.

Among the users using the multifunctional image forming apparatus, some may not use the service provided by the remote server but simply make copies. Therefore, of the functions provided by the image forming apparatus, if a function often used by a user who is likely to use the server service is executed, the user registration process is started, and if a function often used by a user who is not likely to use the server service is executed, the user registration process is not started. In this manner, depending on the function used by the user, an appropriate guidance for user registration can be presented while an unwanted guidance is not given.

More preferably, the image forming service allows setting of a default printing device for the user. The multifunctional image forming apparatus further includes an instructing device instructing setting of the multifunctional image forming apparatus to be the default printing device, when the user registration process is executed.

The process for setting the multifunctional image forming apparatus to be the default printing device can be executed simultaneously with the user registration, and it is unnecessary to set the default printing device separately from the user registration process.

The multifunctional image forming apparatus further includes: a downloading device for downloading print data from the service; a storage device for storing the print data downloaded by the downloading device, in accordance with an instruction from the service; and a printing device for executing either the process for printing the print data downloaded by the downloading device or the process for printing the print data stored in the storage device, in accordance with an instruction from the service.

By the multifunctional image forming apparatus, by the downloading device and the storage device, the print data can be downloaded from the service and stored. Further, by the function of the printing device, either the print data downloaded by the downloading device or the print data stored in the storage device can selectively be printed. If it is known in advance that the print data is to be printed by the multifunctional image forming apparatus, the print data may be downloaded and stored in the storage device before receiving a print instruction from the user, and then printing can be done using the print data stored in advance without downloading the print data from the service when the print instruction is given from the user. As a result, it becomes possible to save the time from when the user requests generation of the print data on the multifunctional image forming apparatus until the actual print is obtained.

As described above, according to the present invention, by the MFP used for image formation, user registration for a specific service can be done easily. As a result, a multifunctional image forming apparatus allowing easier user registration for a service can be provided.

As the user registration process is adapted to start when the user starts a process different from the user registration process on the MFP, it is unnecessary for the user to intentionally start the user registration process. The user can complete the user registration process effectively utilizing the spare time. For instance, when a file is stored in the external storage device and printing of the file is to be done on the multifunctional image forming apparatus, printing takes some time. Therefore, by starting the user registration process in a situation where execution of such a process is likely, it becomes possible to complete the user registration process while effectively using the spare time of the user. Reading of a document by the document reading device also takes some time. By executing the user registration process using this time, it becomes possible for the user to complete the user registration for using a service, effectively using the time.

Further, a default printing device can be designated simultaneously with the user registration, and hence, it is unnecessary to designate the default printing device separately from the user registration. If it is known in advance on the service side which multifunctional image forming apparatus is used for printing the print data based, for example, on the designation of default printing device, the time from when the user actually instructs printing by the multifunctional image forming apparatus until the print is obtained can be made shorter.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
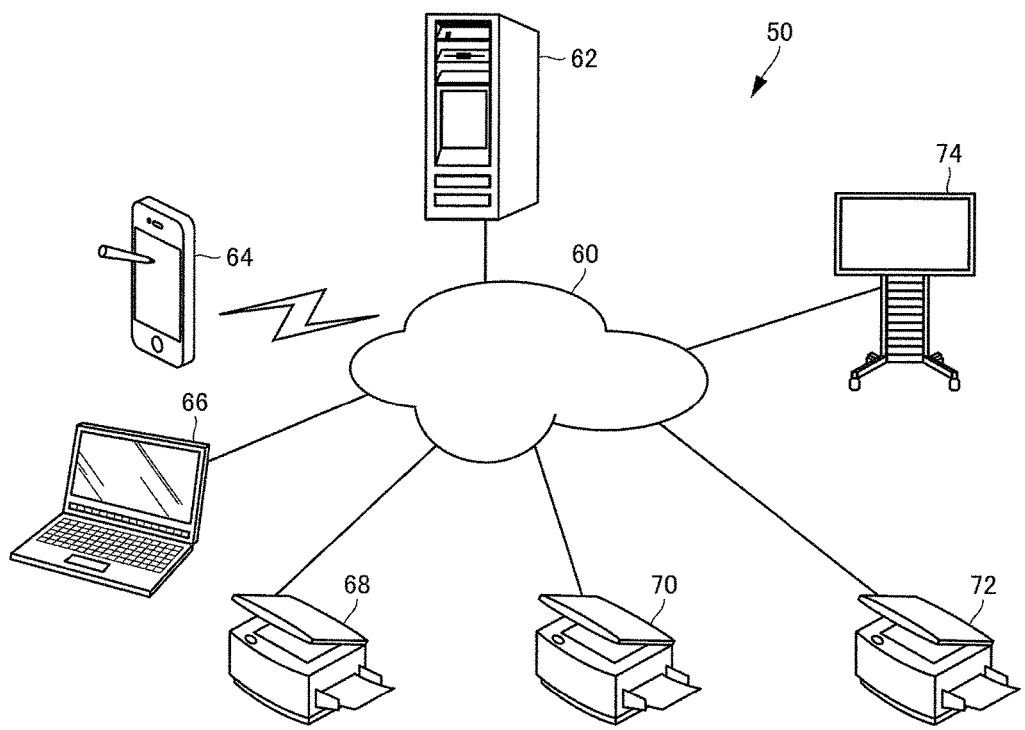
FIG. 1 is a block diagram showing an overall configuration of the network print system in accordance with a first embodiment of the present invention.

In the following description and in the drawings, the same components are denoted by the same reference characters. Therefore, detailed description thereof will not be repeated.

First Embodiment

Configuration

Referring to FIG. 1, cloud service 50 in accordance with the first embodiment of the present invention includes a server 62 for providing the cloud service, connected to the Internet 60. To cloud service 50, a smart phone 64, a client personal computer (hereinafter, personal computer will be simply denoted as "PC") 66, MFPs 68, 70 and 72, an electronic black board 74 and the like are connectable through the Internet 60, and each of these components can use services provided by server 62. In the present embodiment, MFPs 68, 70 and 72 are apparatuses installed at public spaces such as a convenience store, and use by an unidentified number of users is expected.

As to the method of using the cloud service, the method is basically the same regardless of the types of terminals. Therefore, in the following, use of the cloud service by MFP 68 and smart phone 64 will be mainly described.

Figure 2:
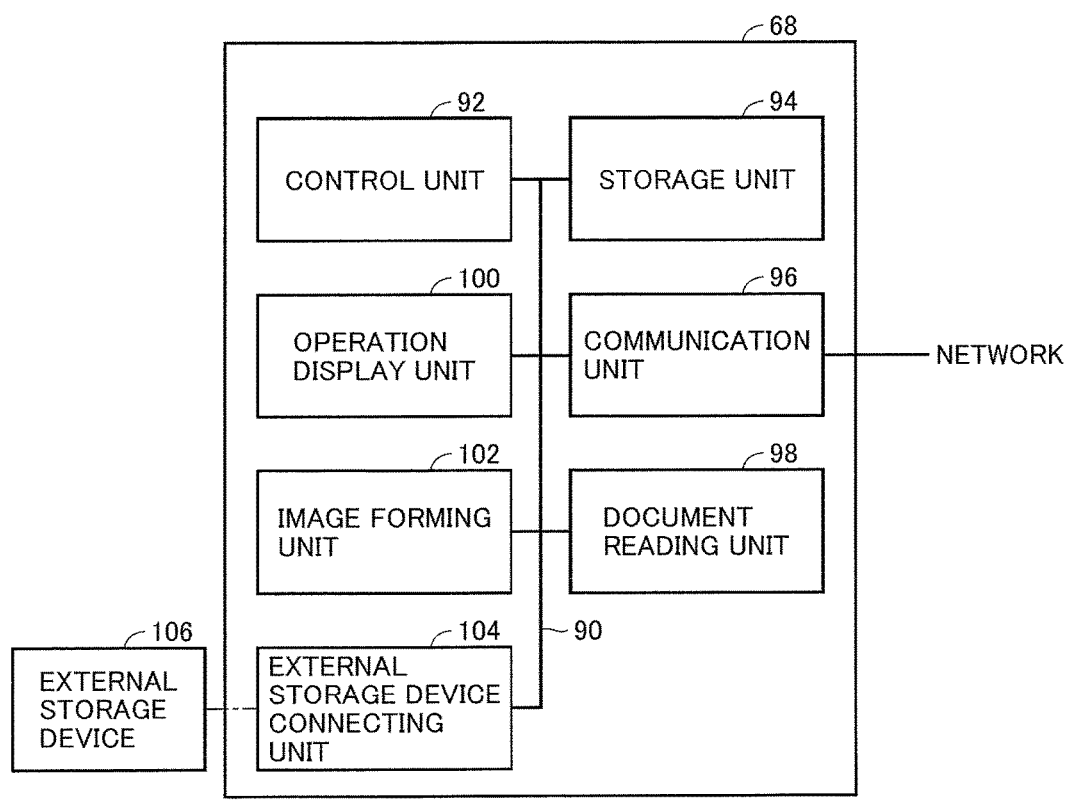
FIG. 2 is a hardware block diagram of an MFP (Multiple Function Peripheral) as an example of the image forming apparatus in accordance with the first embodiment shown in FIG. 1.

Referring to FIG. 2, MFP 68 includes: a control unit 92, which is substantially a computer, including a CPU (Central Processing Unit), an ROM (Read Only Memory) and an RAM (Random Access Memory), executing a program or programs for controlling various components; a communication path 90 connected to control unit 92; an operation display unit 100 connected to control unit 92, for providing UI (User Interface) for operating the MFP, including a liquid crystal display panel and various switches; an external storage device connecting unit 104, connected through communication path 90 to control unit 92, including a connector and an interface (hereinafter, "interface" will be simply denoted as "I/F") allowing connection of an external storage device 106 (for example, a USB memory, SD card or the like), for inputting/outputting data to/from the storage medium; a communication unit 96, connected through communication path 90 to control unit 92 for providing connection to the network (typically, to LAN (Local Area Network) connected to the Internet 60); an image forming unit 102 as a print engine, connected through communication path 90 to control unit 92, performing a process for forming (printing) an image on a prescribed medium (typically, recording paper) under control of control unit 92; a storage unit 94 connected through communication path 90 to control unit 92, for storing various electronic data, print data received from server 62, and other data necessary for providing services; and a document reading unit 98, connected through communication path 90 to control unit 92, for scanning an image on a document, converting the result to electronic image data and outputting to a module designated by control unit 92.

Server 62 shown in FIG. 1 is a computer. Server 62 includes a CPU, an ROM storing a boot program and the like, an RAM providing a temporary storage area, a hard disk drive (HDD) as a non-volatile storage, a media reader/writer allowing connection of a storage medium, a network I/F providing connection to the Internet 60 (see FIG. 1), a display I/F to which a monitor is connected, and an input I/F connecting a keyboard and a mouse to server 62, all not shown as hardware. The CPU, ROM, RAM and HDD of server 62 are used for executing prescribed programs described later, as in a common computer.

Control unit 92 of MFP 68 is substantially a computer as described above, and includes a CPU, an ROM, an RAM, an HDD, a network I/F providing connection to the Internet 60, a display I/F to which a monitor is connected, and an input I/F connecting a keyboard and a mouse to control unit 92, all not shown. The CPU, ROM, RAM and HDD are used for executing prescribed programs described later, as in a common computer.

Figure 3:
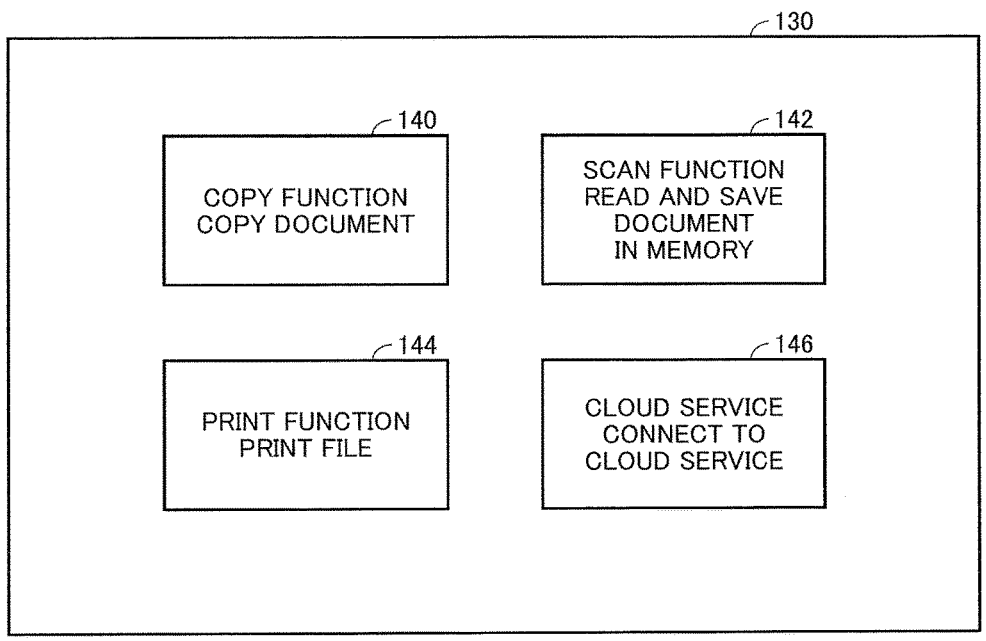
FIG. 3 schematically shows a standby screen of the MFP shown in FIG. 2.

FIG. 3 shows a standby screen 130 generally displayed on operation display unit 100 of MFP 68. Standby screen 130 displays a copy button 140, a scan button 142, a print button 144 and a cloud service button 146. Copy button 140 activates a common copy function. Scan button 142 activates a scan function of scanning a document and saving in an external storage device 106 (see FIG. 2) connected to external storage device connecting unit 104. Print button 144 activates a process for transmitting electronic data stored in external storage device 106 to server 62, downloading print data generated by server 62 to MFP 68, and printing by MFP 68 on a recording medium (in most cases, paper medium). Finally, cloud service button 146 activates a function of accessing the cloud service provided by server 62 through MFP 68. In the cloud service, in addition to printing in response to print button 144, the functions of saving a file and converting to print data, and printing the converted print data by the MFP are provided. It is assumed that user registration is necessary to fully utilize the cloud service.

In the present embodiment, the devices and units execute the following programs.

Figure 4:
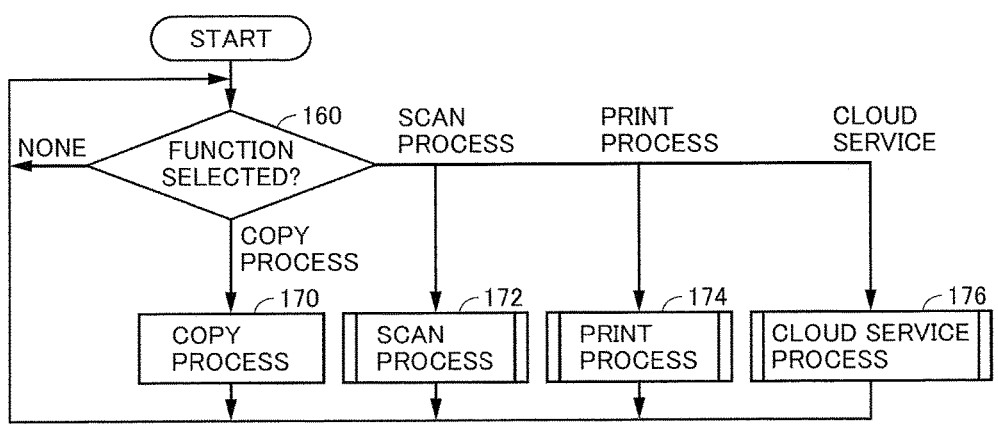
FIG. 4 is a flowchart representing a control structure of a main routine of the program executed by the MFP shown in FIG. 2.

Referring to FIG. 4, the program executed by MFP 68 determines whether or not the user has selected any of the buttons (copy button 140, scan button 142, print button 144 and cloud service button 146 shown in FIG. 3) for selecting any of the functions. If buttons 140, 142, 144 and 146 are selected, the control proceeds to steps 170, 172, 174 and 176, respectively. If none of the buttons is selected, the control returns to step 160.

The copy process executed at step 170 is the same as the common copy process. Therefore, details of step 170 are not described here.

In the following, the print process at step 174, the scan process at step 172 and the cloud service process at step 176 will be described in order.

<Print Process>

Figure 5:
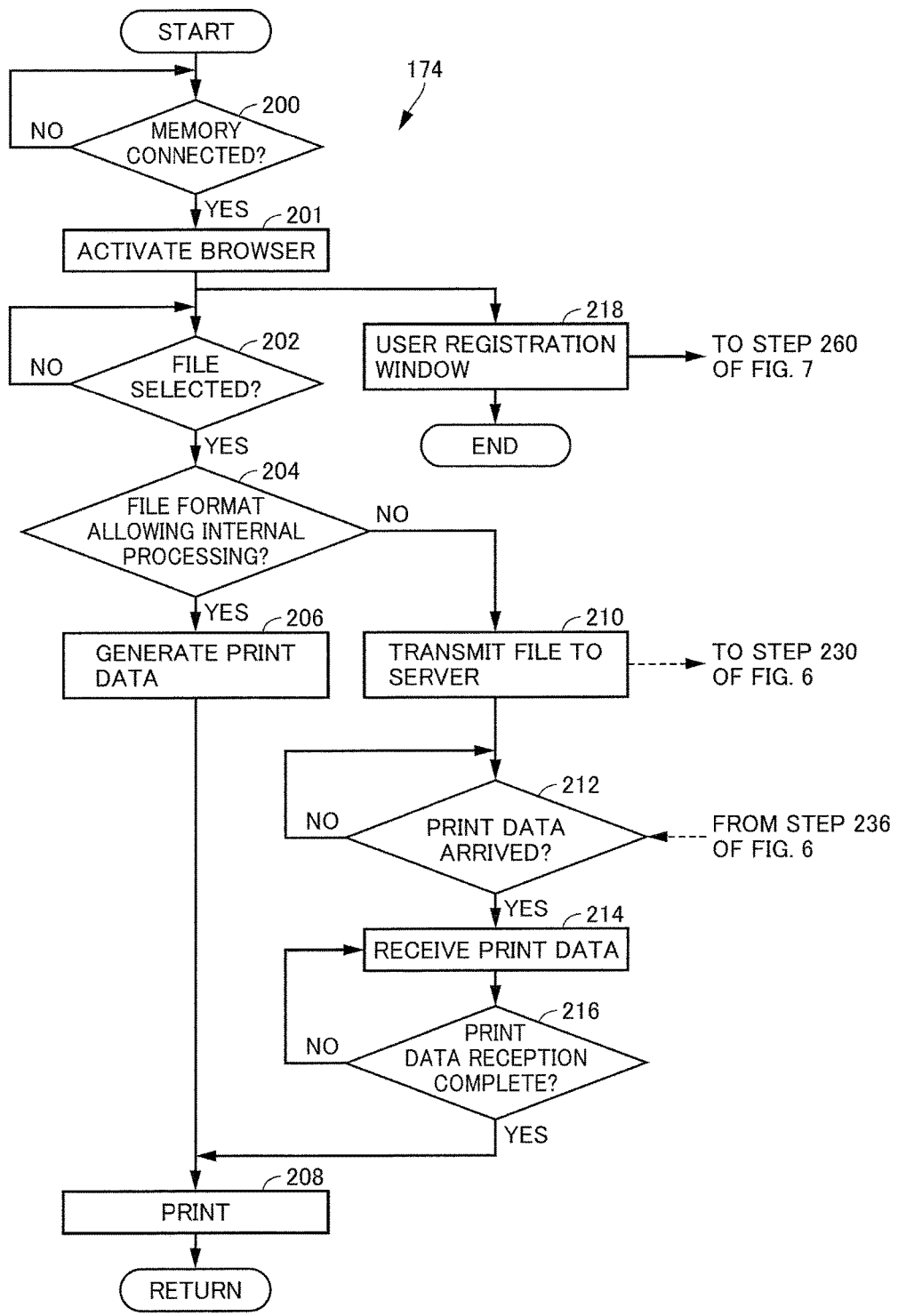
FIG. 5 is a flowchart representing a control structure of a routine for the print process constituting some steps of the program shown in FIG. 2.

Referring to FIG. 5, the program executed by MFP 68 when the print process is designated by the user includes a step 200 urging the user to connect external storage device 106 storing the electronic data to external storage device connecting unit 104 and waiting until it is connected; and a step 201 of activating, in response to the connection of external storage device 106, a browser having two windows.

Figure 8:
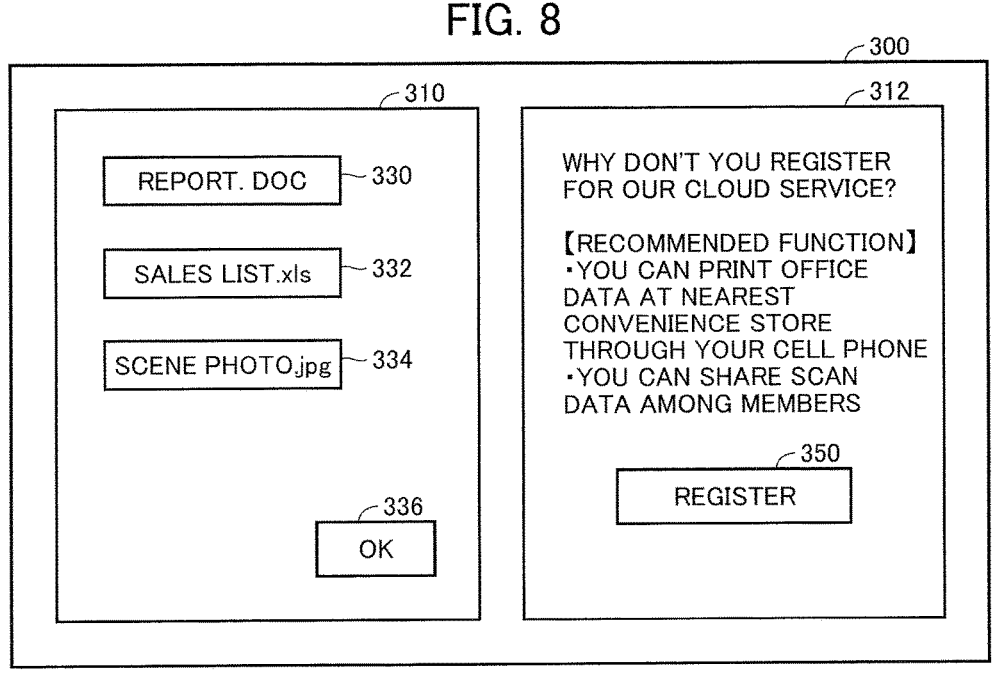
FIG. 8 schematically shows a screen displayed on the display device of MFP when electronic data is printed using the server by the MFP shown in FIG. 2.

FIG. 8 shows an example of the screens displayed at step 201. Referring to FIG. 8, the screen 300 includes a file selection window 310 and a registration window 312 for registration for the cloud service. File selection window 310 includes a list of file names such as file names 330, 332 and 334 obtained by reading all pieces of file information recorded on external storage device 106, and an OK button 336. Registration window 312 includes texts urging the user to register for the cloud service, and a registration start button 350 operated to activate the registration process on server 62.

Actually, screen 300 is realized by a browser having two windows 310 and 312 and a script operated on the browser, and it is displayed on operation display unit 100 at step 201. Windows 310 and 312 are capable of communication with the server independent from each other. Basically, file selection window 310 and registration window 312 have separate forms. The user registration process using registration window 312 of these two windows is activated only when registration start button 350 (FIG. 8) is operated, and the process is substantially executed by server 62. In FIG. 5, this process is shown as step 218 branched from step 201. In the following, the process using file selection window 310 will be mainly described.

File selection on file selection window 310 is realized by locally executing a script. Display of file list on window 310 is realized by a script locally executed on the browser. The process of selecting a file from the file list is also realized by a script locally executed on the browser. After file selection, when the user presses OK button 336, a locally executed script reads the target file from external storage device 106 and transmission to server 62 starts.

The program further includes a step 202 of waiting until the user selects a file on file selection window 310; and a step 204 of determining whether the file selected at step 202 has a file format (such as JPEG) that can be processed inside MFP 68, and branching the control flow depending on the result of determination.

On the other hand, registration window 312 also operates as a browser window independent from file selection window 310. In the example shown in FIG. 8, when the user presses registration start button 350, a form constituting registration window 312 is transmitted to server 62, which serves as a request for activating the user registration process. The user registration process is not started until the user presses registration start button 350. If the user registration process is not started, registration window 312 disappears when the print process ends.

Electronic data are formed in various file formats. Some are in very common file formats and others may be in file formats that can be processed only by specific applications of specific software developer. If the file is of a particular file format, it is often the case that the file cannot be printed by the user's own PC. In such a situation, it would be very convenient if printing of the file is possible by MFP 68 or the like in the public space. One of the reasons why MFP 68 is important is that it enables printing of data in such a file format that is difficult to print by a common PC.

Though there is no problem if data of a common file format is printed, if data of a not-so-common file format is to be printed by MFP 68, an application capable of handling the data of the file format must be prepared in MFP 68. Since MFP 68 is installed at many public spaces, it is impractical to prepare applications corresponding to a large number of file formats in each MFP. Therefore, in the present embodiment, MFP 68 is adapted to be capable of internally processing files of limited file formats only, and data of other file formats are converted to print data by server 62 and the print data is passed to MFP for printing. Thus, applications for processing various and many file formats must be prepared only in server 62 and only the limited applications have to be prepared in MFP 68.

With such an arrangement, if the determination at step 204 is positive, the control proceeds to step 206, at which MFP 68 generates print data from the file selected at step 202, the image of print data is formed on a recording medium at step 208, and the process ends.

If the determination at step 204 is negative, MFP 68 transmits the file selected at step 202 to server 62 at step 210. As described above, the process is realized by the script locally operating on the browser and the form transmission from the browser to server 62.

After the file is transmitted to server 62 at step 210, MFP 68 waits at step 212 until transmission of the print data generated from the file from server 62 starts. If the transmission of print data from server 62 starts (YES at step 212), the print data is received successively (steps 214 and 216), and if the reception is complete (YES at step 216), the control proceeds to step 208. At step 208, the image based on the received print data is formed on the recording medium and the process ends, as described above.

Figure 6:
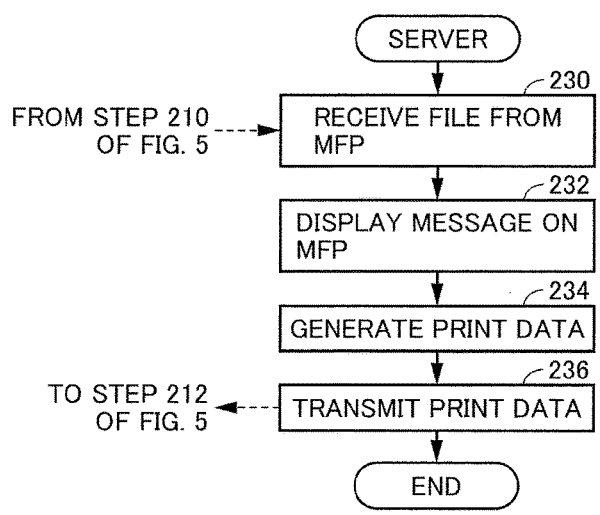
FIG. 6 is a flowchart representing a control structure of a program for generating print data, activated by the server upon reception of a file as an object of printing from the program shown in FIG. 6.

Referring to FIG. 6, receiving the request for activating the print process from an MFP such as MFP 68, server 62 executes the following program. The program includes a step 230 of receiving the file to be printed from MFP 68; a step 232 of transmitting to MFP 68 a response instructing display of a message "WAIT UNTIL PRINTING IS COMPLETE" in connection with the file received at step 230; a step 234 of generating print data from the data received at step 230; and a step 236 of transmitting, after generation of the print data is completed, the print data to MFP 68 and ending the process. Actually, every time a file to be printed is received from an image forming apparatus, execution of the program shown in FIG. 6 starts. The response transmitted at step 232 is a response in HTML format, and it is displayed, for example, in the form of a message screen 380 shown in FIG. 9, on file selection window 310 of FIG. 8.

On the other hand, if the request for activating the process for performing user registration for the cloud service is received by server 62, server 62 activates the user registration process. The program realizing the process has such a control structure as shown in FIG. 7.

Figure 7:
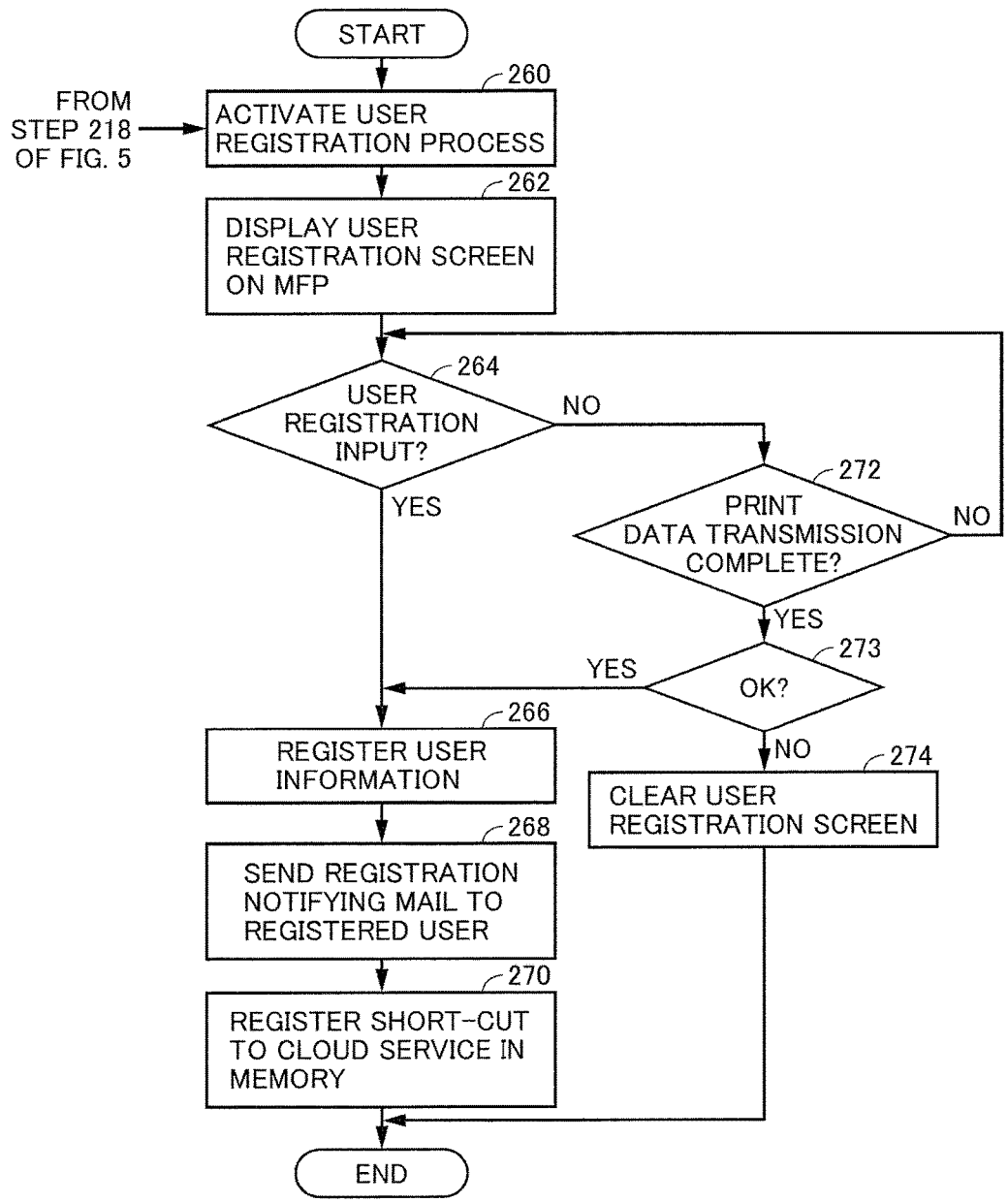
FIG. 7 is a flowchart representing a control structure of a program for user registration, activated by the server when the program shown in FIG. 6 transmits a request for starting user registration process to the server.

Referring to FIG. 7, the program includes a step 260 of receiving the request for activation (transmitted at step 218 of FIG. 5) from MFP 68 and activating the user registration process; and a step 262 of transmitting a response for displaying the user registration screen to MFP 68. The user registration screen is of HTML format, and on operation display unit 100 of MFP 68, it is displayed as user registration screen 382 such as shown in FIG. 9 on registration window 312 of FIG. 8.

Figure 9:
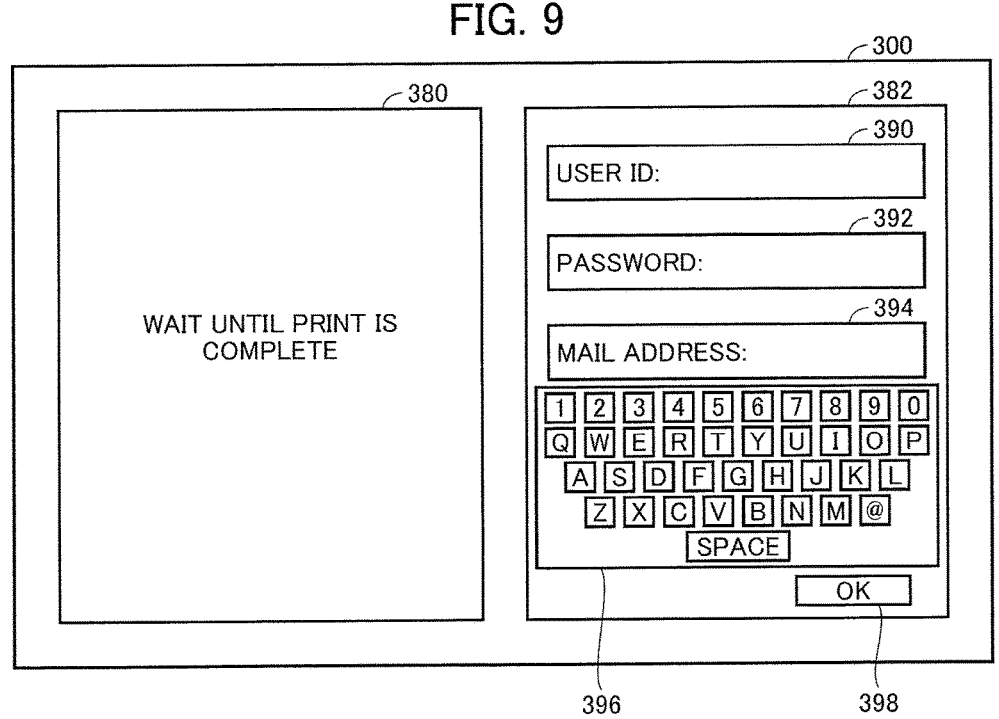
FIG. 9 schematically shows a screen displayed by the MFP when the user registration for the cloud service is started on the screen shown in FIG. 8.

Referring to FIG. 9, user registration screen 382 includes a user ID field 390, a password field 392, a mail address field 394, a soft key area 396 for input, and an OK button 398. The fields included in user registration screen 382 are all commonly used at the time of user registration and, therefore, details thereof will not be described here.

Again referring to FIG. 7, the user registration process program further includes: a step 264, following step 262, of determining whether or not an input of user registration (HTTP request in a form format) using user registration screen 382 has been transmitted from MFP 68; and a step 266, executed if the determination at step 264 is positive, of registering the user information with a user database, not shown, using the transmitted user information. Actually, at step 266, it is necessary to check presence/absence of the same user ID and the like. These processes, however, are common and, therefore, details will not be described here.

The program further includes: a step 268, following step 266, of forming an electronic mail notifying registration for the cloud service to the registered user and transmitting the electronic mail to the address entered in mail address field 394 of FIG. 9; and a step 270, following step 268, of transmitting an instruction to MFP 68 to register a short-cut to the cloud service in external storage device 106 of MFP 68 and ending the process. Since a short-cut is registered with external storage device 106, the user can easily access the cloud service next time, using the short-cut.

Figure 11:
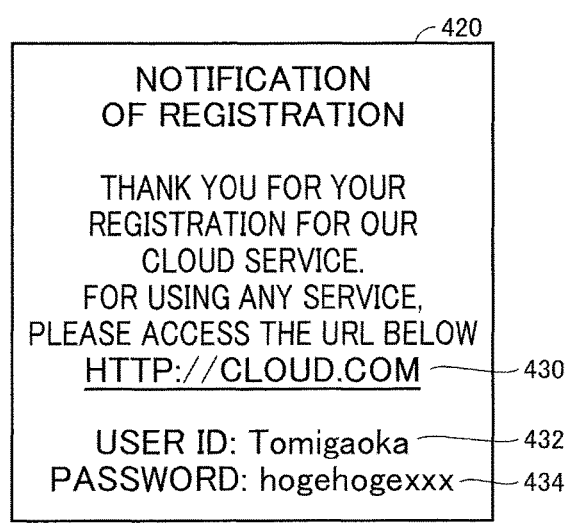
FIG. 11 schematically shows main text of an electronic mail informing completion of the user registration, transmitted by the server to the user who completed the user registration on the MFP.

FIG. 11 shows an example of the main text of the mail transmitted to the mail address of the user at step 268. The main text 420 of mail includes a message notifying completion of registration, a URL 430 for accessing the cloud service, and user ID 432 and password 434 that are registered. Password 434 may not be displayed.

Figure 10:
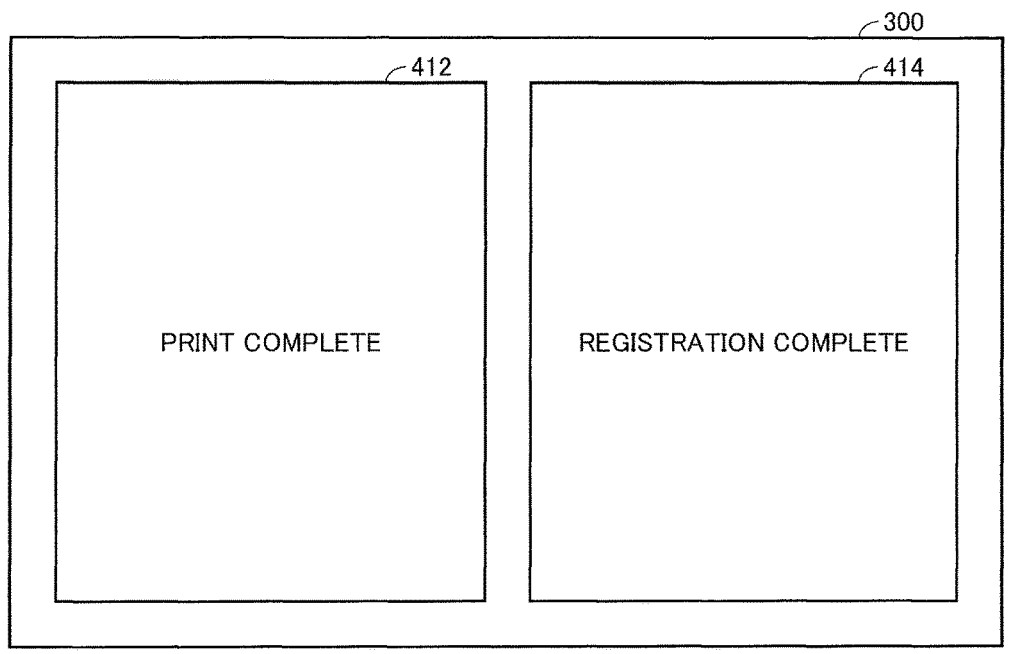
FIG. 10 schematically shows a screen displayed on the display device of the MFP when the user registration is completed.

Referring to FIG. 7, the program further includes; a step 272, executed if the determination at step 264 is negative, of determining whether or not transmission of print data from server 62 to MFP 68 has been completed, and returning the control to step 264 if not; and a step 273 of displaying, when transmission of the print data is completed, a cancel button for cancelling the user registration on the user registration screen shown in FIG. 9 and waiting for a user input. If the user continues input for user registration and presses the OK button at step 273, the control proceeds to step 266, and if the user presses the cancel button, the control proceeds to step 274. If the OK button is pressed, the user registration is done through steps 266, 268 and 270, a print complete message 412 and registration complete message 414 shown in FIG. 10 are displayed on operation display unit 100, and the process ends. If the cancel button is pressed, the screen is cleared at step 274, and the process ends.

<Scan Process>

Figure 12:
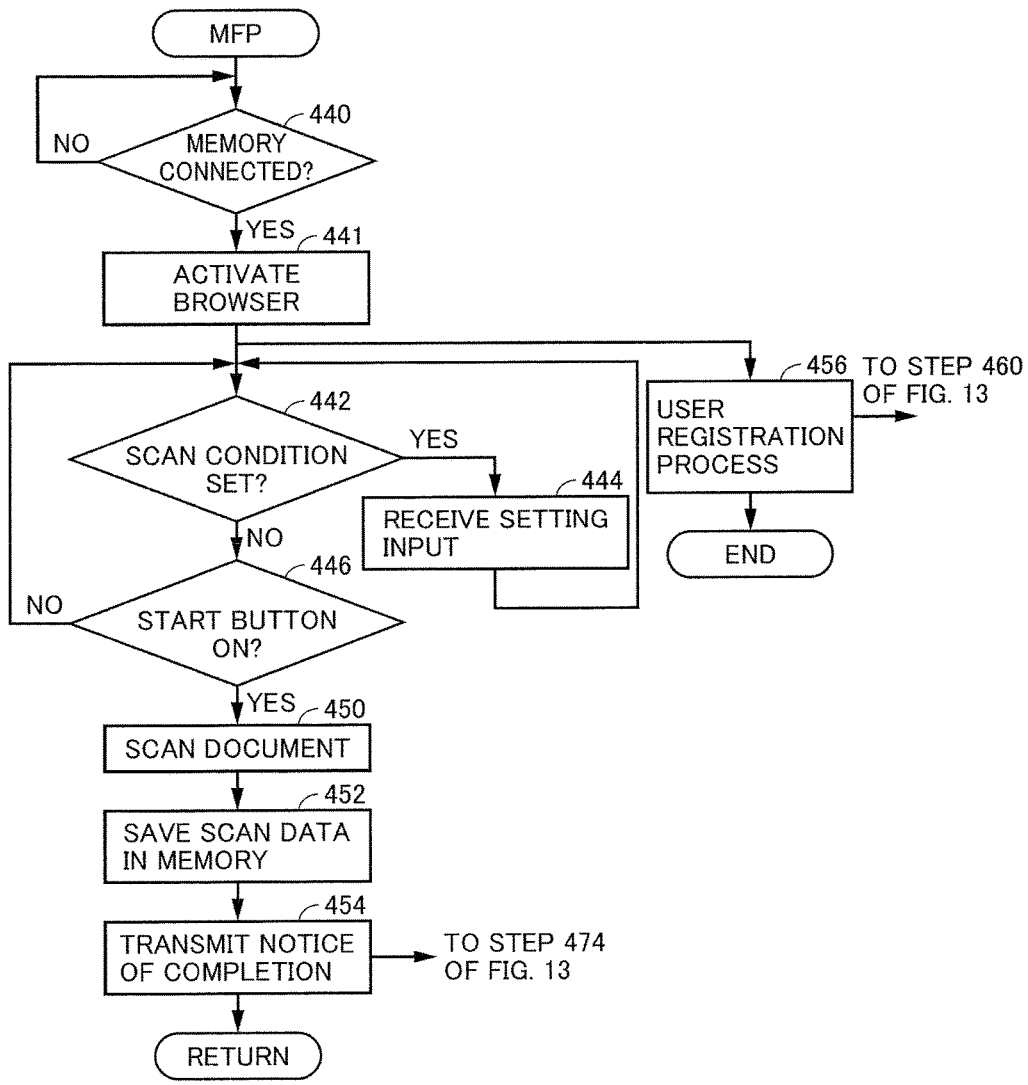
FIG. 12 is a flowchart representing a control structure of a program executed by the MFP in accordance with the first embodiment when the user selects a scan process.

Referring to FIG. 12, the program for realizing the scan process in MFP 68 has the following control structure. The program includes: a step 440 of waiting until external storage device 106 is connected to external storage device connecting unit 104; and a step 441 of displaying, when external storage device 106 is connected, a screen similar to that shown in FIG. 8 but having a document reading screen in place of file selection window 310 on operation display unit 100. The window is realized by a browser capable of operating the left side and the right side independent from each other. Thereafter, setting of scan conditions is done on the left window and the user registration process is done on the right window. Specifically, step 441 of FIG. 12 effectively results in simultaneous activation of the process for setting the scan conditions and the process for user registration by the browser. Here, the step corresponding to the process of user registration is represented by step 456. At step 456, the same window as registration window 312 on the right side of FIG. 8 is displayed. When registration start button 350 is pressed, the message is transmitted as a request for activating the user registration process to server 62, and the user registration process utilizing the browser screen is activated. The contents will be described later with reference to FIG. 13. The process executed by MFP 68 for user registration is the same as the common browser operation and, therefore, details thereof will not be described here.

The program shown in FIG. 12 further includes: a step 442 of determining whether or not the user has input settings of scan conditions; a step 444, executed if the input for setting scan conditions has been done (YES at step 442), of changing the scan conditions of MFP 68 in accordance with the user input, and returning the control to step 442; and a step 446, executed if it is determined at step 442 that the input for setting scan conditions has not been done, of determining whether or not the start button is pressed, and returning the control to step 442 if not.

The program further includes: a step 450, executed if it is determined at step 446 that the start button has been pressed, of reading a document placed on document reading unit 98 by controlling document reading unit 98, and converting the result to electronic data; a step 452 of saving the scanned data in external storage device 106; and a step 454, following the completion of the process at step 452, of transmitting notification that the scan process is finished, to server 62 and ending the process.

Figure 13:
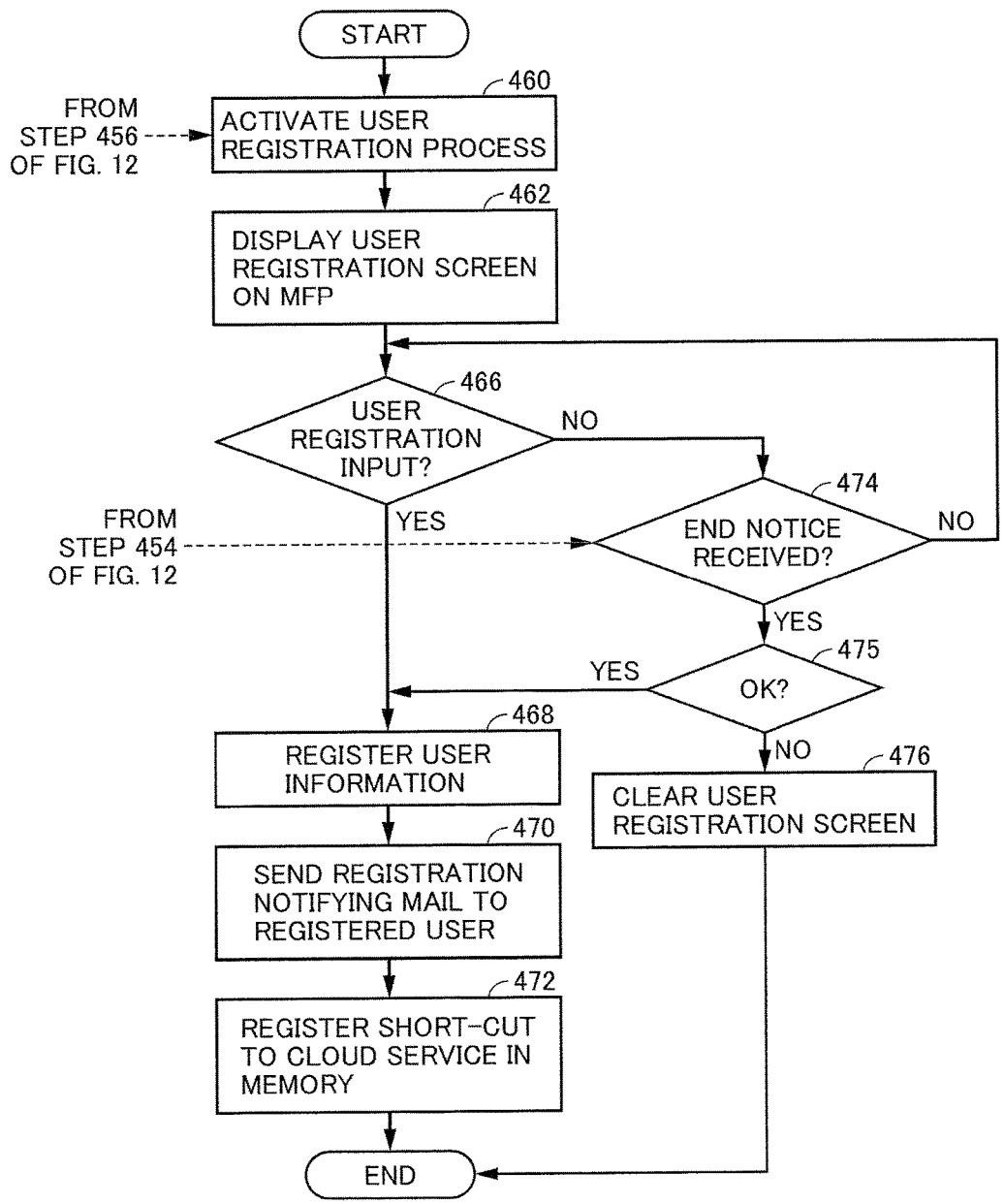
FIG. 13 is a flowchart representing a control structure of a program for user registration, activated by the print server in response to a user registration request transmitted by the MFP when the program shown in FIG. 12 is executed.

When the user pressed registration start button 350 at step 456 of FIG. 12, the request for activating the user registration process is transmitted to server 62. In response to the activation request, server 62 activates a program having the following control structure. Referring to FIG. 13, the program includes: a step 460 of activating the user registration process in response to the activation request; and a step 462 of transmitting an http response for displaying the user registration screen to the MFP. Receiving the response, the browser is activated in MFP 68, and the user registration screen similar to screen 300 shown in FIG. 8 is displayed.

The program further includes: a step 466, following step 462, of determining whether OK button 398 shown in FIG. 9 is pressed; a step 468, after OK button 398 is pressed and user registration data is input, of registering the user information with a user database (not shown) for the cloud service; a step 470 of transmitting an electronic mail notifying the user of registration for the cloud service; and a step 472 of transmitting an instruction to MFP 68 to register a short-cut to the cloud service with the external storage device 106 and ending the process.

The program further includes: a step 474, executed if it is not determined at step 466 that OK input is received, of determining whether the notification of scan process completion has been received from MFP 68 (step 454 of FIG. 12), and returning the control to step 466 if not; and a step 475, executed if it is determined at step 474 that the notification of scan process completion has been received, of displaying a screen similar to that of FIG. 9 and additionally including a cancel button for cancelling the user registration, and waiting for user input. If the OK button is pressed at step 475, the control proceeds to step 468. If the cancel button is pressed at step 475, an instruction to clear the user registration screen is transmitted to MFP 68 at step 476, and the process ends.

As the program described above is executed in MFP 68 and server 62, the scanning process and the process for executing user registration for the cloud service simultaneously with scanning by MFP 68 can be realized.

<Cloud Service Process>

The process for realizing the cloud service includes two different programs, that is, one for accessing the cloud service from a small terminal such as a smart phone, and the other for accessing the cloud service from a terminal having relatively ample hardware resources. In the example described below, the program is mainly controlled by server 62, and the terminal operates for input to/output from server 62, using the browser. In the following, details of the program running on server 62 will be described, where the terminal is a smart phone 64. The program executed when the terminal is MFP 68 or the like will be described later, with reference to FIG. 21 and the following figures.

(Access from Smart Phone to Cloud Service)

Figure 14:
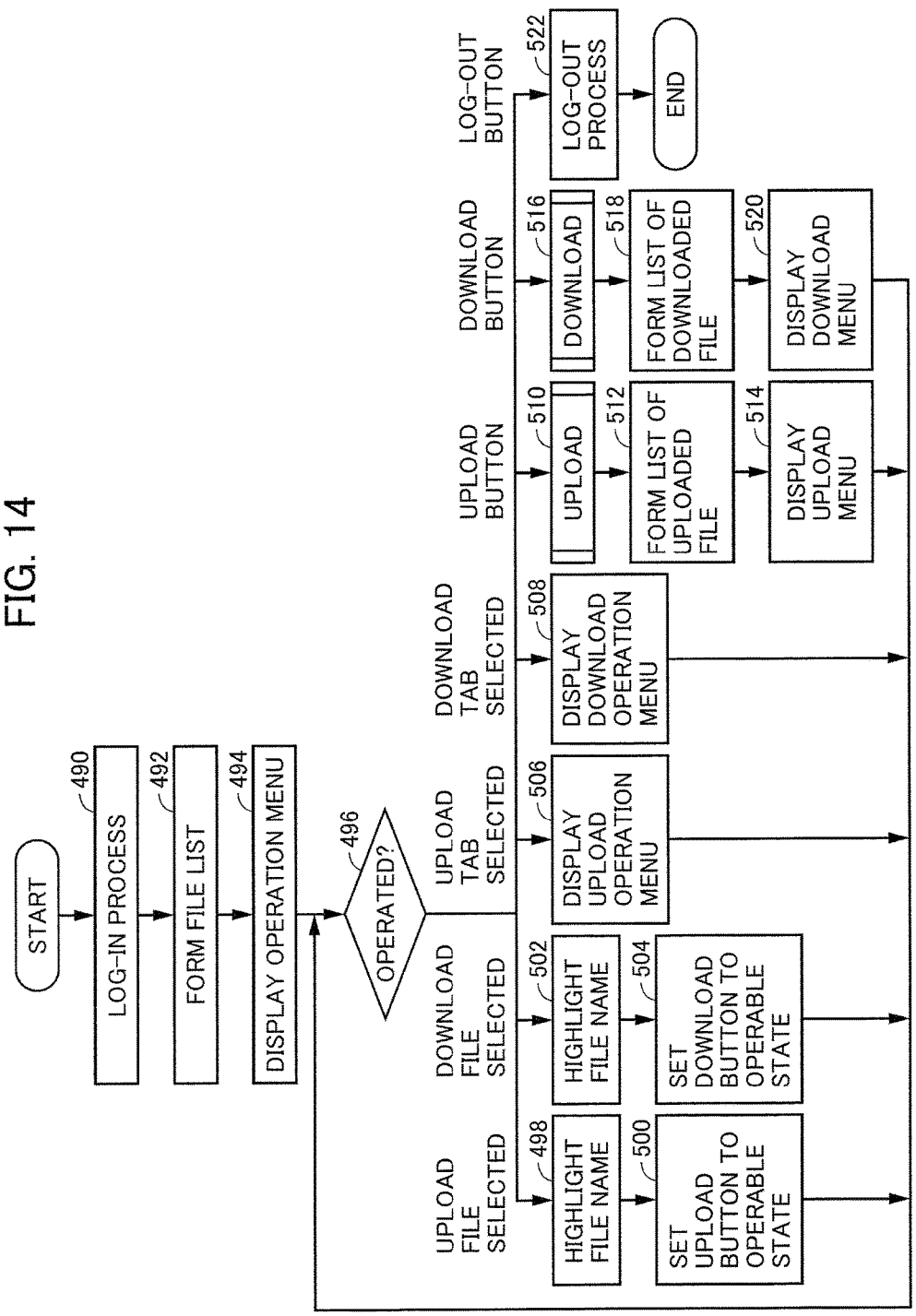
FIG. 14 is a flowchart representing a control structure of a program for providing a service with the user who accessed the cloud service from a smart phone, in the print server of the system in accordance with the first embodiment.

Referring to FIG. 14, the program includes a step 490 of log-in process of the user. Here, under the control of server 62, the browser is activated by smart phone 64, and a log-in screen 530 such as shown in FIG. 15 is displayed by the browser.

Figure 15:
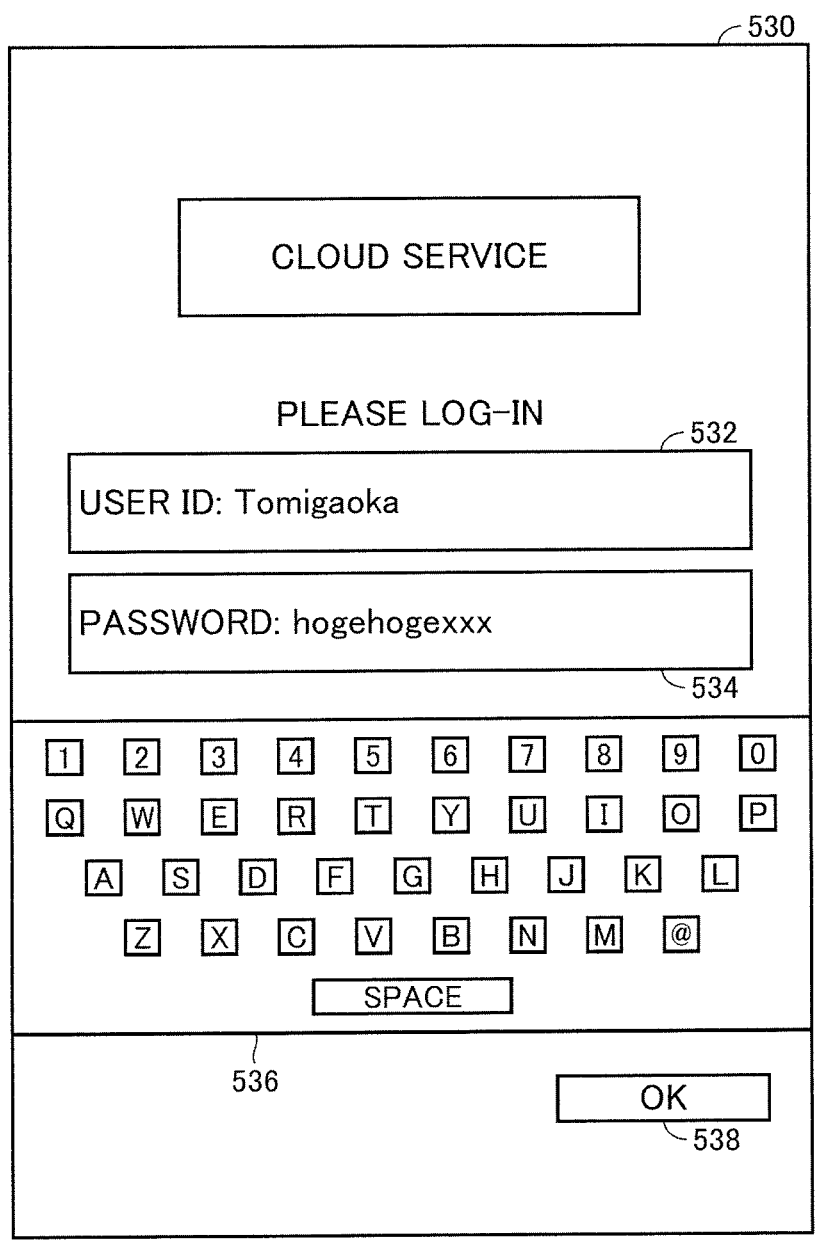
FIG. 15 schematically shows a log-in screen when the user logs-in to the cloud service from a smart phone.

Referring to FIG. 15, log-in screen 530 includes a user ID field 532, a password field 534, a soft keyboard area 536, and an OK button 538. For easier understanding, common alphabets are shown in password field 534 in FIG. 15. By adding password attribute to the field, however, the input password comes to be displayed as prescribed characters (for example, dots (•)). By entering the user ID to user ID field 532 and password to password field 534 and pressing OK button 538, the user ID and the password are transmitted to server 62. If the combination exists in a user database, not shown, server 62 permits log-in of the user, and denies if not. Such checking related to the user ID and the password is a routine operation and, therefore, details are not shown in the example of FIG. 14.

The program further includes: a step 492 of forming a list of files to be the object of operation when log-in process at step 490 is successful, both for the server (for downloading) and for the smart phone (for uploading); and a step 494 of displaying an operation menu on a screen by the browser of smart phone 64, using the file list formed at step 492.

Figure 16:
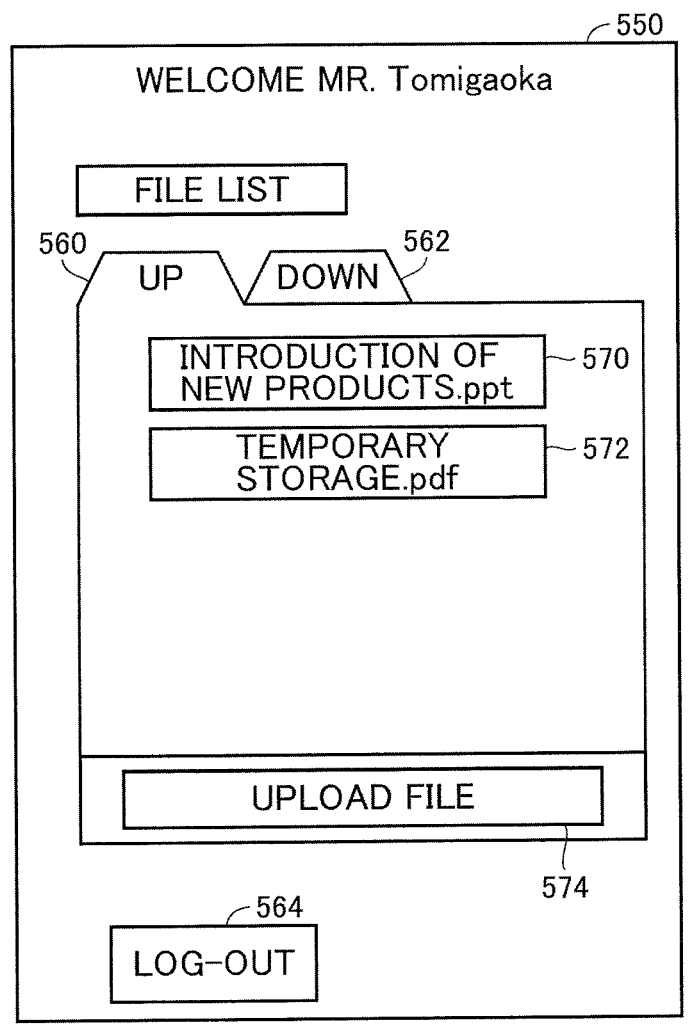
FIG. 16 schematically shows a screen for uploading a file displayed on the smart phone after log-in to the cloud service.
Figure 19:
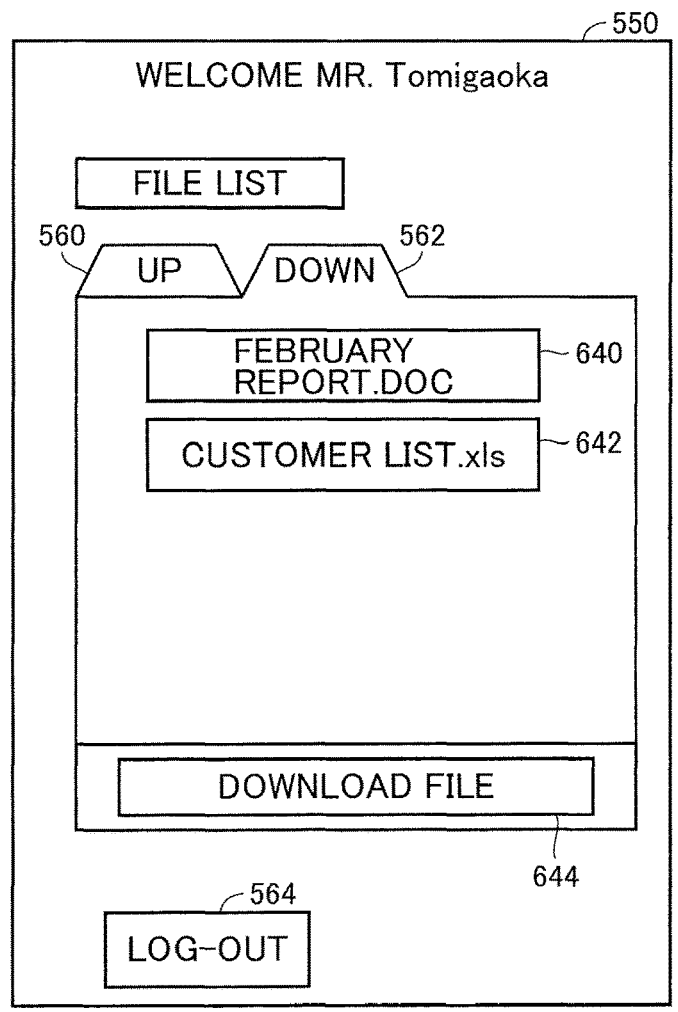
FIG. 19 schematically shows a file download screen displayed on the smart phone.

Referring to FIG. 16, a file operation menu 550 includes a menu tab 560 for uploading, a menu tab 562 for downloading, and a log-out button 564. What is shown in FIG. 16 is a menu for uploading, which includes a file list including file names 570 and 572 in the smart phone to be the object of uploading, and an upload button 574. The menu for downloading is shown in FIG. 19. Referring to FIG. 19, the menu for downloading includes a file list including file names 640 and 640 in the server to be the object of downloading, and a download button 644. The menu for uploading and the menu for downloading can be switched by pressing menu tab 560 for uploading and menu tab 562 for downloading. Which of menu tab 560 for uploading and menu tab 562 for downloading is to be displayed at step 494 may be set by the user. Here, it is assumed that menu tab 560 for uploading is displayed as a default. In the display provided at step 494, upload button 574 of menu tab 560 for uploading and download button 644 of menu tab 562 for downloading are both grayed-out and inoperable.

Again referring to FIG. 14, the program further includes a step 496 of determining what operation is selected by the user, and branching the control flow depending on the result of determination. The relations between the operations by the user and the steps executed in response to the operations are as follows. It is noted that, in the program described below, when the menu for uploading is displayed on the screen, only the elements of the menu for uploading can be operated. Similarly, when the menu for downloading is displayed, only the elements of the menu for downloading can be operated. Further, no matter which is selected, the control returns to step 496 when the process ends.

(1) When a file name on the menu for uploading is selected

The control proceeds to step 498, at which the selected file name is highlighted. At step 500, upload button 574 is set to an operable state.

(2) When a file name on the menu for downloading is selected

The control proceeds to step 502, at which the selected file name is highlighted. At step 504, download button 644 is set to an operable state.

(3) When menu tab 560 for uploading is selected

The control proceeds to step 506, at which the menu for upload operation is displayed.

(4) When menu tab 562 for downloading is selected

The control proceeds to step 508, at which the menu for download operation is displayed.

(5) When upload button 574 is operated

The control proceeds to step 510, at which the selected file is uploaded from the smart phone to the server. Details of this operation will be descried later with reference to FIG. 17. At step 512, the list of uploaded files is formed. As a result of this process, the file list for uploading is returned to the initial state. At step 514, the upload operation menu is displayed.

(6) When download button 644 is operated

The control proceeds to step 516, at which the selected file is downloaded from the server to the smart phone. Details of this operation will be described later with reference to FIG. 20. At step 518, the list of downloaded files is formed. As a result of this process, the file list for downloading is returned to the initial state. At step 520, the download operation menu is displayed.

(7) When log-out button 564 is operated

The control proceeds to step 522, at which an operation for log-out is done, and thereafter, execution of the program ends. The operation for log-out includes saving user operation history on the server side, and displaying a screen indicating log-out on the smart phone screen.

(Upload Process)

Figure 17:
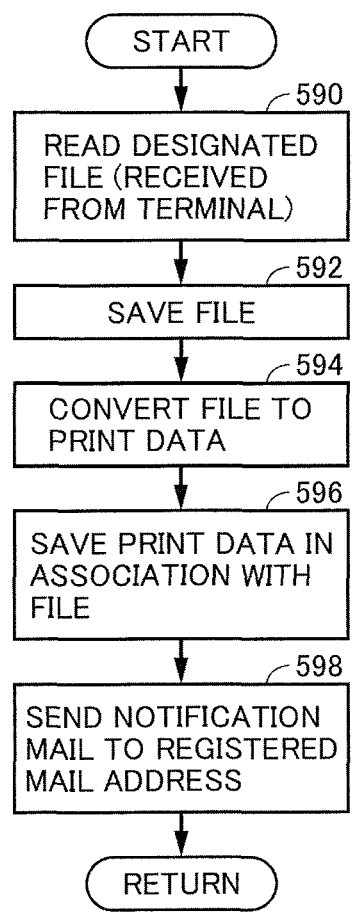
FIG. 17 is a flowchart representing a control structure of a program executed by the server for realizing the process of uploading a file to the server and printing.

Referring to FIG. 17, at step 510 of FIG. 14, the following upload process is executed. First, the designated file in the smart phone is received from the smart phone (step 590). The file is saved in an area for the logged-in user in the storage device of the server (step 592). The saved file is converted to print data using an appropriate application (step 594). The generated print data is saved in association with the file received from the smart phone, in the storage device (step 596). To the mail address of the logged-in user, an electronic mail notifying that conversion to print data has been completed is sent (step 598), and the process ends.

Figure 18:
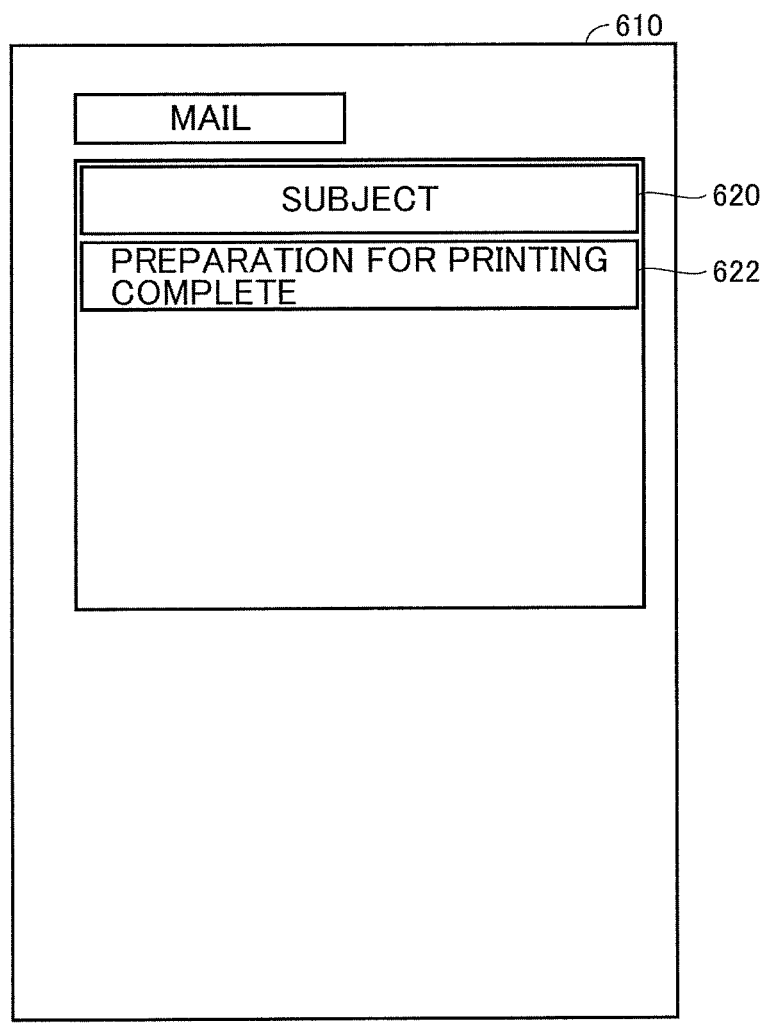
FIG. 18 schematically shows a main text of an electronic mail issued by the server, informing the user of the smart phone that generation of print data is completed.

FIG. 18 shows an example of the electronic mail sent to the user at step 598. Referring to FIG. 18, the electronic mail 610 includes a subject box 620 and a main text box 622. Though simplified here, the cloud service name may be displayed on subject box 620, and names of the files that are ready to print may be displayed in main text box 622.

(Download Process)

Figure 20:
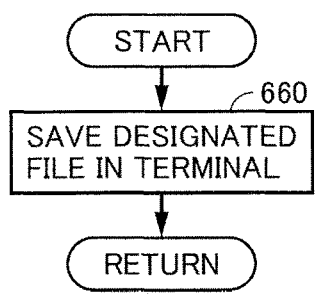
FIG. 20 is a flowchart representing a control structure of a program executed by the server for realizing the process for downloading a file to the smart phone.

Referring to FIG. 20, details of the download process executed at step 516 of FIG. 14 will be described. As shown in FIG. 20, this process includes a step 660 of reading the file as the object of downloading (file in the server) designated by the smart phone from the storage device of the server and transmitting it to the terminal. The terminal receives the file and saves the file in a storage device in the terminal. When transmission of the file is completed, the download process ends.

(Access from MFP 68 to the Cloud Service)

In the present embodiment, processes available when MFP 68 uses the cloud service include the process of downloading the print data already generated by the cloud service and forming the image thereof on a recording medium using image forming unit 102 ("print process") and the process of reading a document by controlling document reading unit 98 and saving the obtained document data in server 62 ("document saving process").

Figure 21:
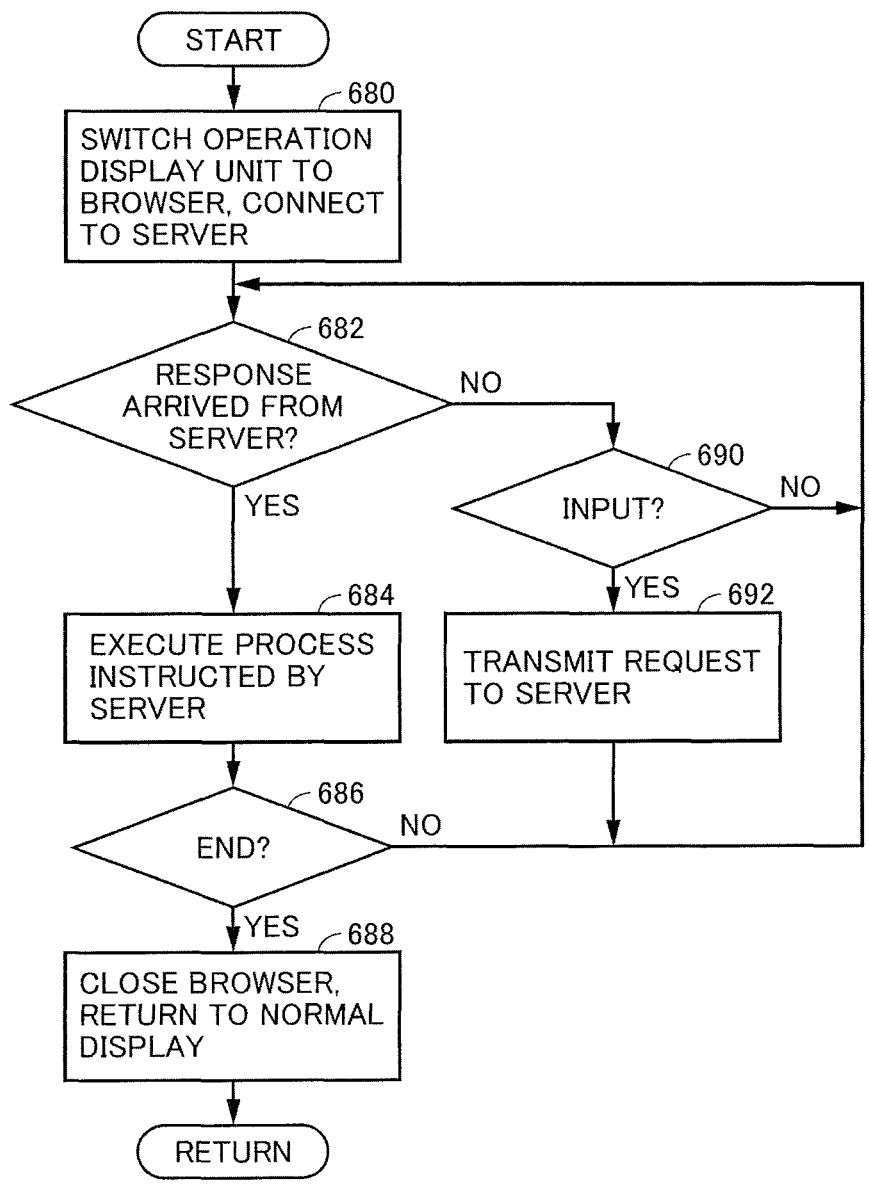
FIG. 21 is a flowchart representing a control structure of a program executed by the MFP to enable use of the cloud service from the MFP.

Referring to FIG. 21, in MFP 68, when cloud service button 146 is pressed on the screen shown in FIG. 3, the following program is executed by MFP 68. The following process is the same as that executed by a typical browser. The program includes: a step 680 of activating the browser as a display program for operation display unit 100 and connecting the browser to the server; and a step 682 of branching the control flow depending on whether any response (instruction) is received from the server. The program further includes: a step 684 of executing a process in accordance with the instruction from the server if a response is received from the server; a step 686 of determining whether or not use of the cloud service is to be terminated, and branching control flow; and a step 688 of closing the browser in response to the determination that the use of cloud service is to be terminated, resuming the display of standby screen shown in FIG. 3 and ending execution of the program. If it is not determined at step 686 that the use of cloud service is to be terminated, the control returns to step 682.

The program further includes: a step 690, executed if it is determined at step 682 that any response has not been received from the server, of determining whether or not there is a user input through operation display unit 100, and returning the control to step 682 if not; and a step 692, executed if it is determined at step 690 that there has been a user input, transmitting a request in accordance with the input to the server, and returning the control to step 682.

Figure 22:
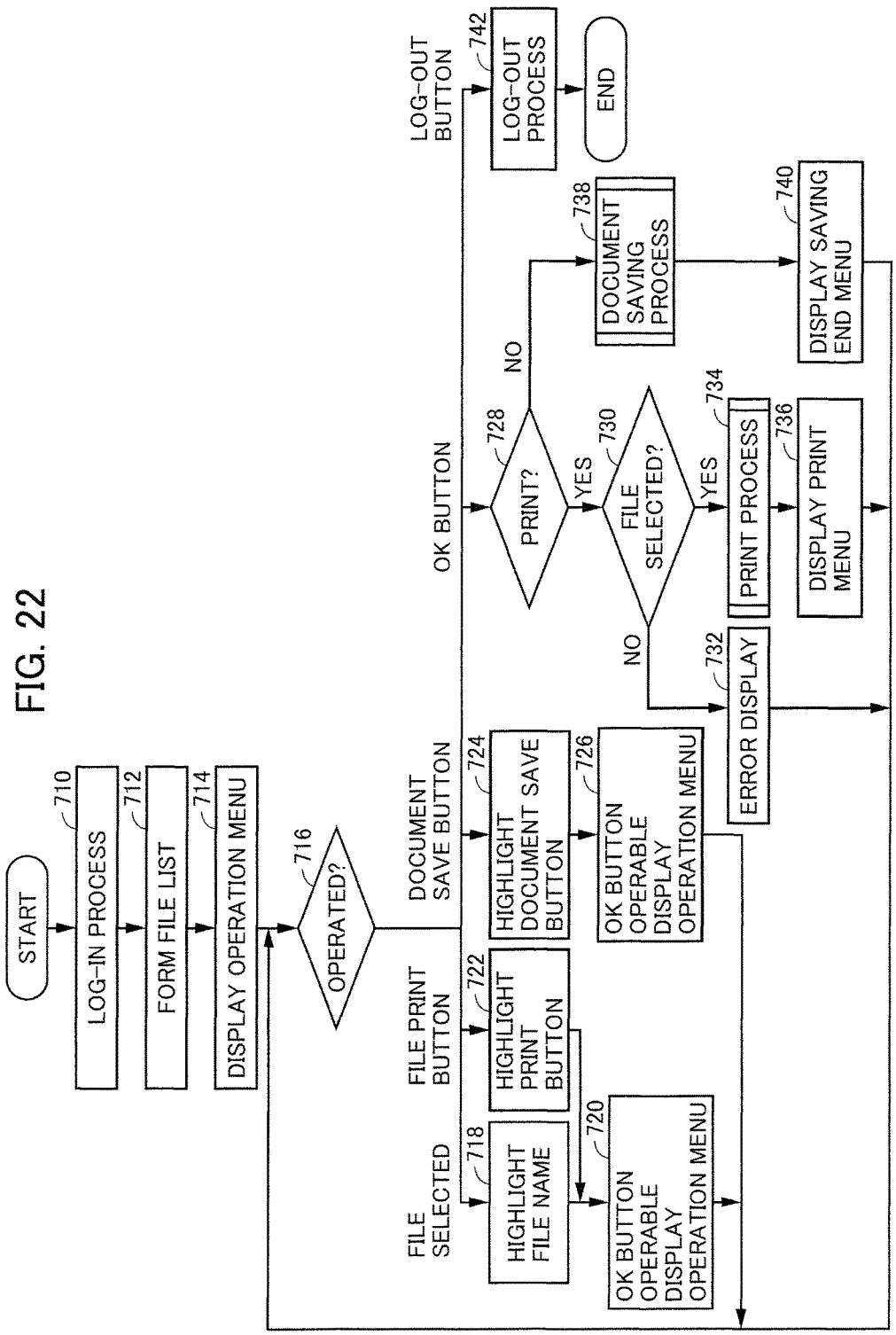
FIG. 22 is a flowchart representing a control structure of a program executed by the server for providing the cloud service to the user of the MFP.

Referring to FIG. 22, the program executed by the server in response to the process of FIG. 21 includes: a step 710 of causing the browser of MFP 68 to display the log-in screen, to allow log-in process by the user; a step 712, executed if the log-in process at step 710 is successful, of forming the upload file list from the files of MFP 68 and forming the download file list from the files of the server, respectively; a step 714 of displaying the operation menu on the browser of MFP 68, using the file lists formed at step 712; and a step 716 of branching the control flow based on a request transmitted from the browser when the user makes any operation.

Figure 23:
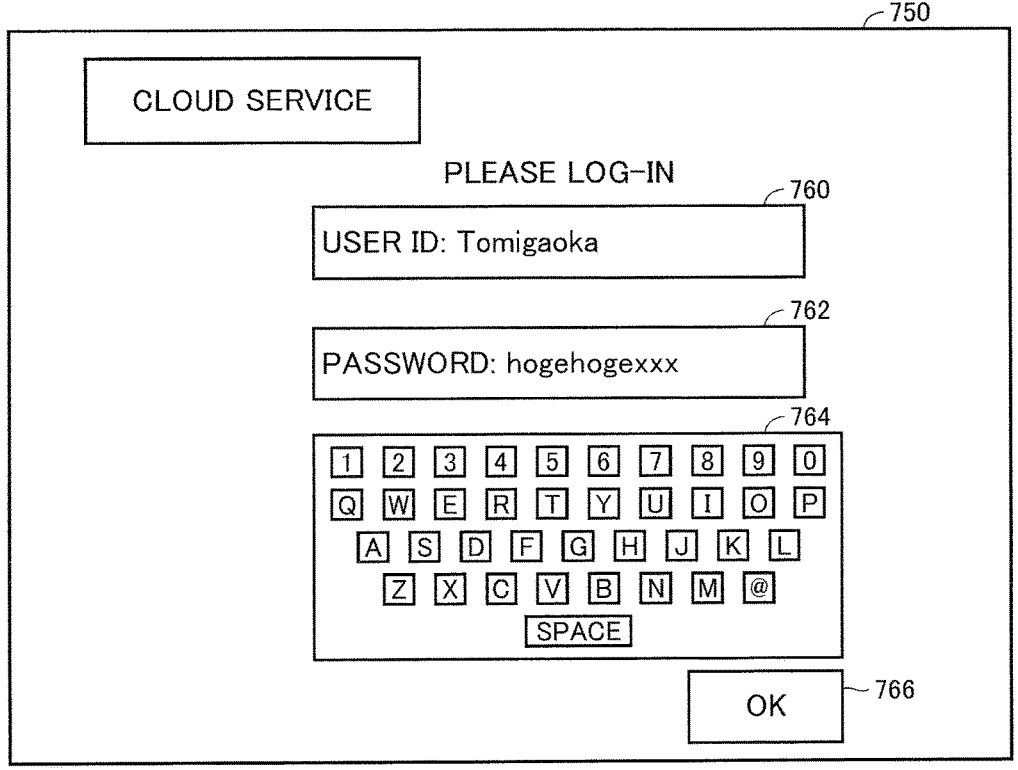
FIG. 23 schematically shows a log-in screen displayed by the MFP for log-in from the MFP to the cloud service.

FIG. 23 shows an example of the log-in screen 750 displayed on operation display unit 100 of MFP 68 at step 710. Log-in screen 750 is similar to log-in screen 530 from the smart phone shown in FIG. 15, and it includes a user ID field 760, a password field 762, a soft keyboard area 764, and an OK button 766. For easier understanding, common alphabets are shown in password field 762 in FIG. 23. By adding password attribute to the field, however, the input password comes to be displayed as prescribed characters (for example, dots (•)). By entering the user ID to user ID field 760 and password to password field 762 and pressing OK button 766, the user ID and the password are transmitted to server 62. If the combination exists in a user database, not shown, server 62 permits log-in of the user, and denies if not.

Figure 24:
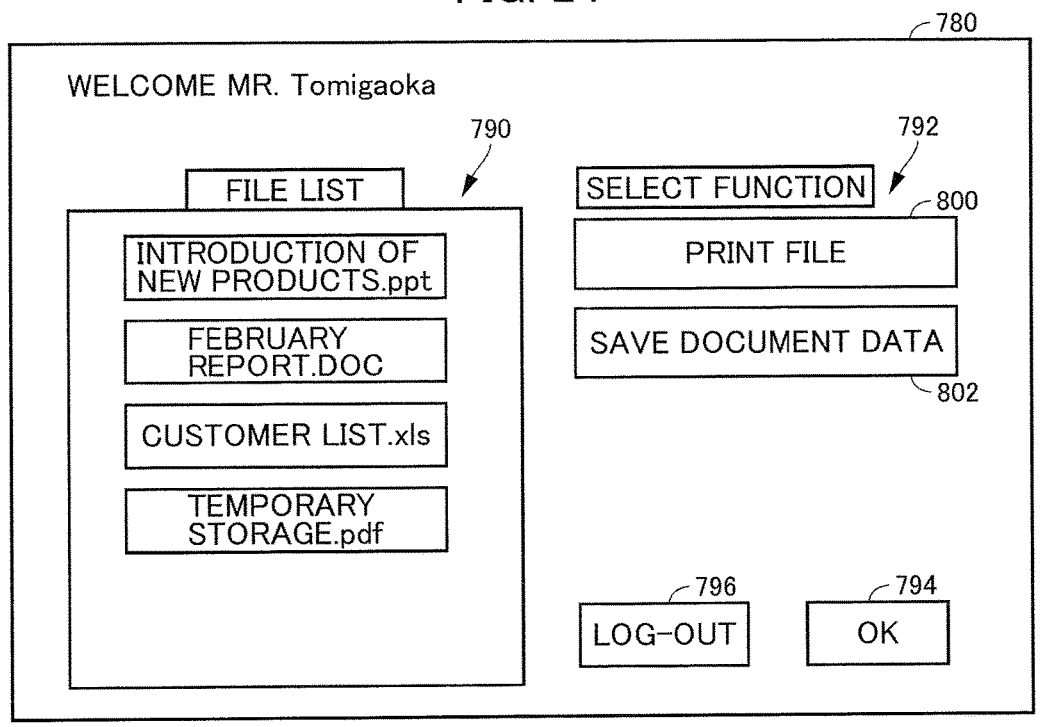
FIG. 24 schematically shows a screen displayed by the MFP after log-in from the MFP to the cloud service.

FIG. 24 shows an example of the operation menu screen displayed at step 714 of FIG. 22. The operation menu 780 includes a file list pane 790, a function selection menu 792, an OK button 794 and a log-out button 796. Function selection menu 792 includes a print button 800 for executing the print process, and a document saving button 802 for executing a process for reading a document and saving the document data. File list pane 790 displays file names of the print data formed from the files of the user and saved in server 62, in the form of a list.

In the present embodiment, when operation menu 780 is displayed for the first time, print button 800 and document saving button 802 are not in the selected state, and none of the file names in file list pane 790 is in the selected state, either. In such a state, the server cannot start any process and, therefore, OK button 794 is grayed-out and in an inoperable state.

Again referring to FIG. 22, the relations between the operations detected at step 716 and the processes activated by the respective operations are as follows. No matter which is selected, the control returns to step 716 when the process ends.

(1) When any of the file names in file list pane 790 is selected

When any of the file names in file list pane 790 is designated, the file name is highlighted at step 718, and the file name is stored. After step 718, at step 720, if print button 800 has already been selected, OK button 794 is set to the operable state, and if not, the operation menu is displayed with the OK button 794 set in the inoperable state.

(2) Print button 800

Figure 25:
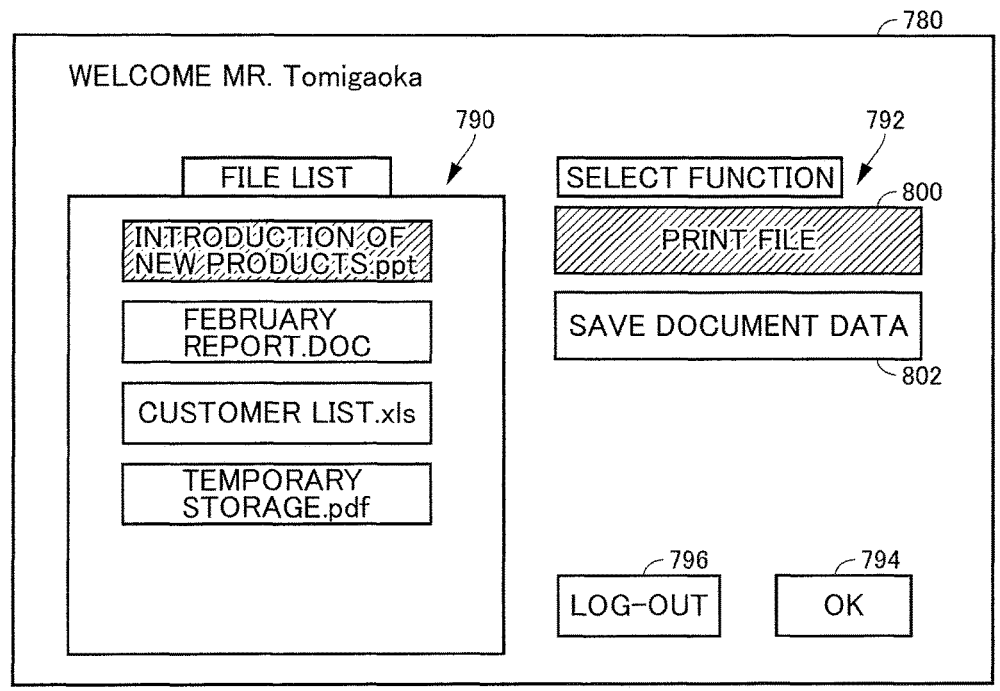
FIG. 25 schematically shows an example of a screen displayed by the MFP when a file is printed utilizing the print service of the server.

If print button 800 is operated when document saving button 802 has been highlighted, the highlight is cancelled, and print button 800 is highlighted (step 722). FIG. 25 shows operation menu 780 in which a file of "INTRODUCTION OF NEW PRODUCT" is selected and print button 800 is selected. As shown in FIG. 25, in the present embodiment, the selected button is highlighted for emphasis. Thereafter, the control proceeds to step 720, at which OK button 794 is set to the operable state if any of the file names as the object of printing is selected, and sets OK button 794 to the inoperable state if not.

(3) Document Saving Button 802

Figure 28:
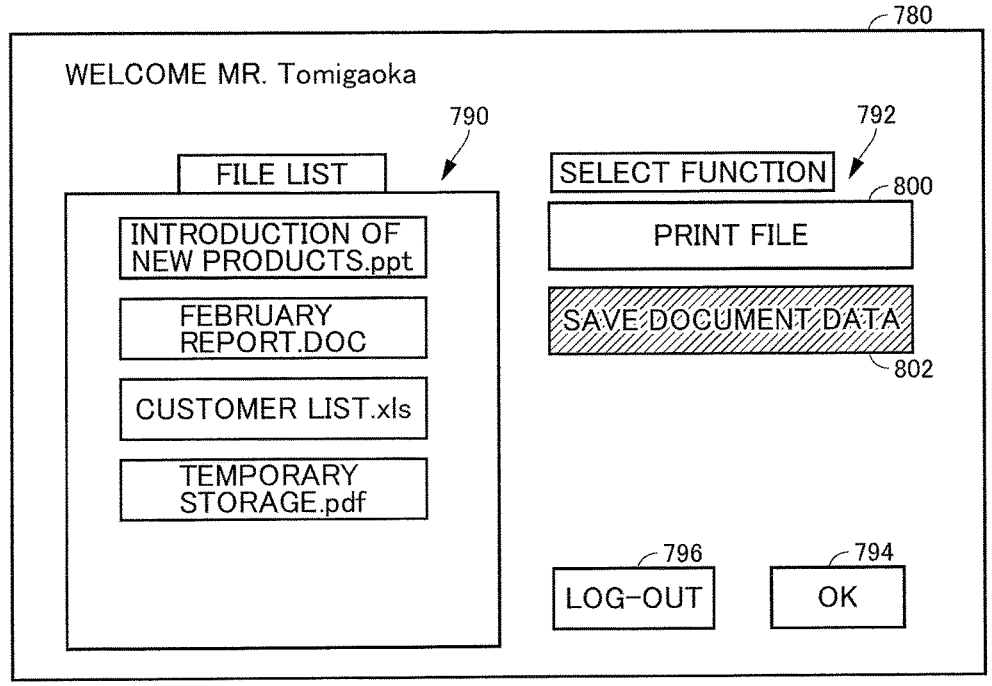
FIG. 28 shows an example of a screen of the MFP when a document is scanned by the MFP and saved in a portable memory.

If document saving button 802 is operated when print button 800 is highlighted, the highlight is canceled, and document saving button 802 is highlighted (step 824). The operation menu in which OK button 794 is operable is displayed. FIG. 28 shows operation menu 780 in which document saving button 802 is highlighted.

(4) OK button 794

Figure 27:
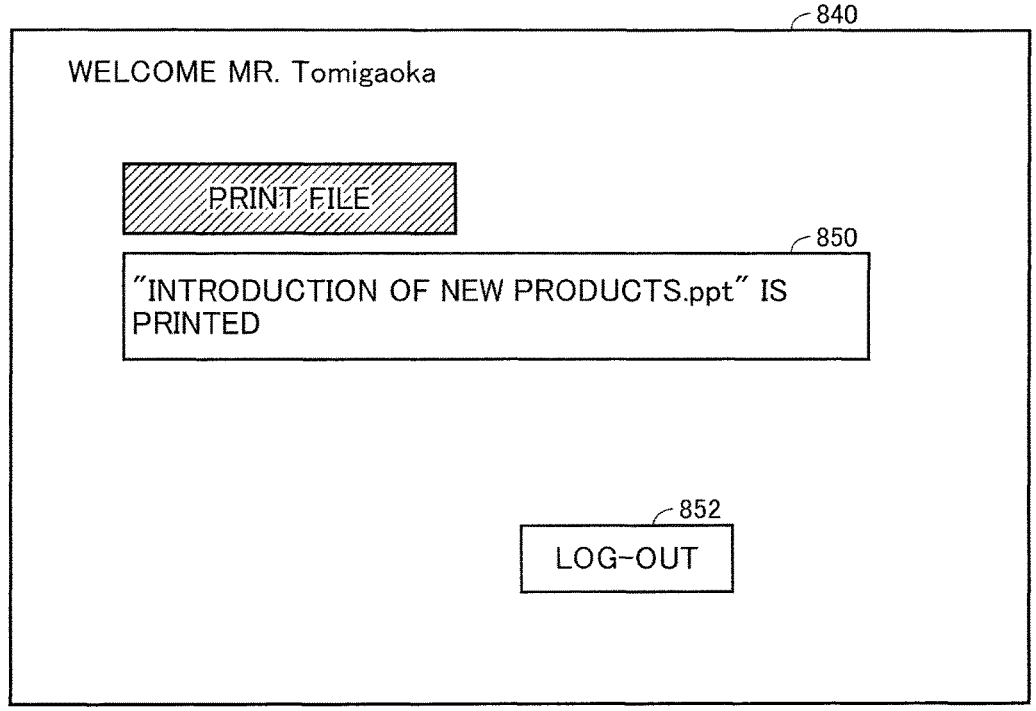
FIG. 27 schematically shows a screen displayed by the MFP at the end of printing, after the print service from the server is used by the MFP.

When OK button 794 is pressed, first, whether or not print button 800 is selected is determined (step 728). If print button 800 is selected, whether or not any of the files in file list pane 790 is selected is determined (step 730). If none of the files is selected, an operation menu including an error message is displayed (step 732). If any file is selected, the print process as will be described later is performed (step 734), and a print end menu 840 such as shown in FIG. 27 is displayed (step 736). Print end menu 840 includes a message 850 indicating completion of printing and a log-out button 852. In this embodiment, when printing of one file ends, log-out is the only option for the user.

Figure 30:
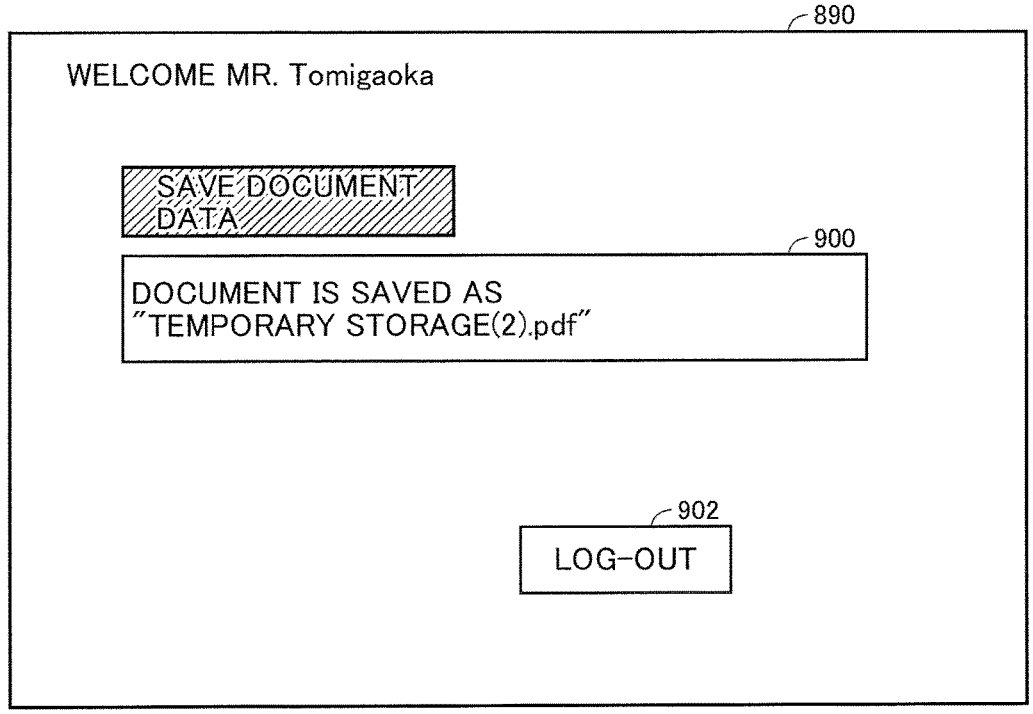
FIG. 30 schematically shows a screen displayed by the MFP at the end of scanning.

At step 728, if it is determined that not the print button 800 but the document saving button 802 is selected, the document saving process, which will be described later, is executed at step 738. Thereafter, at step 740, a saving end menu is displayed. An example of the saving end menu is shown in FIG. 30. Referring to FIG. 30, saving end menu 890 includes a message 900 indicating the name of the saved file, and a log-out button 902. What is operable in saving end menu 890 is only the log-out button 902.

Therefore, if the document saving process is done, in the present embodiment, log-out is the only option after the end of the process.

(5) Log-out Button 796, 852 or 902

If log-out button 796, 852 or 902 is operated, the log-out process is executed at step 742, the standby screen is displayed on MFP 68, and execution of the program ends.

(Printing Process)

Figure 26:
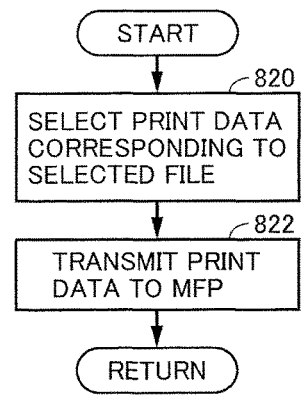
FIG. 26 is a flowchart representing a control structure of a program executed by the print server for providing the print service to the MFP.

The control structure of the program executed at step 734 of FIG. 22 will be described with reference to FIG. 26. First, the print data corresponding to the selected file is read from the storage device of server 62 (step 820). The read file is transmitted to MFP 68 at the following step 822, and the process ends.

(Document Saving Process)

Figure 29:
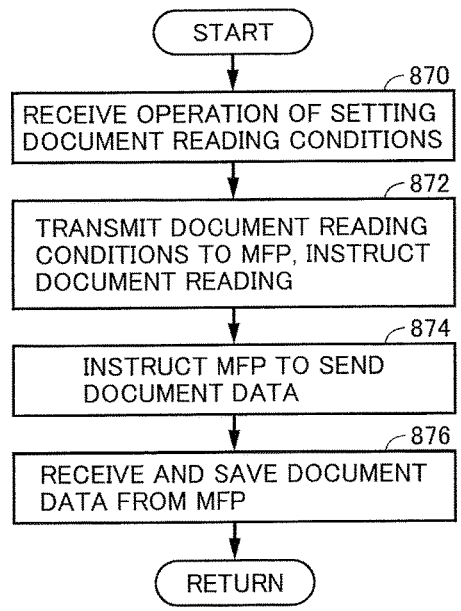
FIG. 29 schematically shows a control structure of a program executed by the server when the user instructs scanning, in the system in accordance with the first embodiment.

The control structure of the program for realizing the document saving process executed at step 738 of FIG. 22 will be described with reference to FIG. 29. In this process, first, an operation for setting document reading conditions is received. The conditions set here include type of document, magnification, whether collective processing such as 2-in-1 is requested, and setting of color or black-and-white. At the next step 872, a command to read a document is sent, together with the document reading conditions, to MFP 68. In response to the command, MFP 68 starts reading the document and generates document data. At step 874, MFP 68 is instructed to transmit the read document to server 62, and the control waits for the document data. In response to the command, MFP 68 transmits the document data page by page to server 62. At step 876, the document data transmitted from MFP 68 is received and saved. When the reception and saving are executed for all document data, the document saving process ends.

[Operation]

The system operates in the following manner. Here, how the MFP, smart phone and the server constituting the system operate in four processes, that is, (1) printing of a file from the MFP, (2) reading of a document by the MFP, (3) uploading of a file from the smart phone and (4) printing of the uploaded file by the MFP, will be described.

(1) Printing of a File from the MFP

Here, the user has a document file to be printed stored in advance in external storage device 106. It is assumed that the document file is of a format that cannot be printed by the MFP, and hence, it requires generation of print data by the server. The screen on the MFP is the standby screen shown in FIG. 3.

When the file is to be printed, the user goes to the MFP, holding external storage device 106. The user selects print button 144 on standby screen 130. Then, by the determination at step 160 of the program shown in FIG. 4, in the MFP, the process of step 174 is executed. At step 174, the program shown in FIG. 5 is executed.

The program shown in FIG. 5 urges the user to connect the external storage device 106 storing the electronic data to external storage device connecting unit 104, and waits until it is connected (step 200). When the user connects external storage device 106 to external storage device connecting unit 104, the MFP activates the browser in place of the native UI. The browser displays screen 300 shown in FIG. 8. The browser includes file selection window 310 and registration window 312 for the cloud service. On file selection window 310, the list of files in external storage device 106 is displayed, by the locally executed script. On the other hand, a form such as shown in the figure is displayed in the HTML format in window 312. These windows operate separately from each other.

—Process by File Selection Window 310—

MFP 68 reads all pieces of information of the files recorded on external storage device 106, displays the screen of file selection window 310 by the browser, and waits until the user selects a file (step 202).

When the user selects a file from the file list on file selection window 310 and presses OK button 336, MFP 68 determines whether the selected file can be processed for printing inside MFP 68. Here, it is assumed that the selected file cannot be processed in MFP 68. Therefore, the control proceeds to step 210 of FIG. 5. At step 210, MFP 68 transmits the selected file to server 62. Thereafter, MFP 68 waits at step 212 until transmission of the print data generated from the file from server 62 starts.

On the other hand, when the file to be printed is transmitted from MFP 68, in the server, the process shown in FIG. 6 is activated. At step 230, the file is received, and at step 232, in order to display a message that the print data is being generated on file selection window 310, a document in the HTML format for displaying the message is transmitted to the browser of MFP 68 (step 232). Then, server 62 selects an appropriate application for the received file, generates the print data (step 234), transmits the generated print data to MFP 68, and ends the process.

Again referring to FIG. 5, MFP 68 waits until transmission of the print data from server 62 starts (NO at step 212), and if the transmission starts (YES at step 212), successively receives the transmitted print data (steps 214 and 216). When reception of all print data is completed (YES at step 216), MFP 68 forms an image on the received print data on a recording medium, and ends the process.

—Process by Registration Window 312—

Registration window 312 operates simultaneously and parallel with file selection window 310, as a browser window independent from file selection window 310. In the example shown in FIG. 8, when the user presses registration start button 350, the form constituting registration window 312 is transmitted to server 62, and serves as a trigger for activating the user registration process. If the user does not press registration start button 350, no operation is executed in connection with the user registration, and when the printing ends, registration window 312 is erased. Here, it is assumed that the user presses registration start button 350. The request for starting the user registration process is transmitted to server 62 at step 218 of FIG. 5. In response to the start request, server 62 starts the user registration process shown in FIG. 7.

Referring to FIG. 7, at steps 260 and 262, user registration screen 382 shown in FIG. 9 is displayed on the right half of screen 300. When the user enters necessary piece of information to user ID field 390, password field 392 and mail address field 394 and presses OK button 398 before completion of print data transmission (determination at step 272 is NO), the determination at step 264 becomes YES in FIG. 7, so that steps 266, 268 and 270 are successively executed and user registration is complete.

If the transmission of print data is completed before the input by the user is complete (YES at step 272), at step 274, a screen similar to user registration screen 382 displayed at step 264 and additionally having a button for confirming whether or not user registration is to be continued is displayed on operation display unit 100 of MFP 68, and the control waits for the user input. If the user presses the cancel button and stops registration, the user registration screen is cleared at step 274, and the process ends without user registration. If the user enters pieces of information necessary for user registration and presses OK button 398, the process proceeds to step 266, and thereafter, the user registration is done in accordance with the procedure described above.

When printing and user registration are both completed, the screen shown in FIG. 10 is displayed on operation display unit 100 of MFP 68. After a prescribed time period, this screen is erased, and standby screen 130 shown in FIG. 3 is displayed.

At step 268, an electronic mail such as shown in FIG. 11 is transmitted to the user. Then, the user can use the cloud service easily, by accessing the URL 430 described in the electronic mail and entering the user ID 432 and password 434 on the displayed log-in screen.

(2) Document Reading by MFP

The document reading by MFP 68 is done in the following manner. On standby screen 130 of MFP 68 shown in FIG. 3, the user presses scan button 142. In the program (FIG. 4) executed by MFP 68, by the determination at step 160, the control proceeds to step 172, at which the program having the control structure shown in FIG. 12 is activated. At step 440, a message urging connection of external storage device 106 to external storage device connecting unit 104 is displayed, and the control waits until external storage device 106 is connected. When external storage device 106 is connected to external storage device connecting unit 104, a screen similar to that shown in FIG. 8 is displayed on operation display unit 100 (step 441). It is noted, however, that on file selection window 310, a scan setting screen is displayed in accordance with an instruction from server 62. Registration window 312 is the same as that displayed in the printing process.

When the user inputs setting of scan conditions, the scan conditions are changed through process steps 442 and 444. When the user presses a button that corresponds to OK button 336 shown in FIG. 8, in the process of FIG. 12, scanning of a document starts at step 450 through the path of steps 442 and 446. The scanned document data is saved in external storage device 106 at step 452. When saving ends, a message indicating that document reading is complete is transmitted from MFP 68 to server 62 at step 454.

On the other hand, if a user wishes to have registration for the cloud service while the document is scanned by MFP 68 and presses registration start button 350, from the browser activated at step 441, a request for activating the user registration process is transmitted to server 62 at step 456. As a result, the process shown in FIG. 13 is activated in server 62.

Referring to FIG. 13, at step 460, server 62 receives the activation request, and at step 462, displays the user registration screen similar to user registration screen 382 shown on the right half of FIG. 9, on the right half of operation display unit 100 of MFP 68. If the user enters necessary pieces of information and presses the OK button before completion of scanning, the process of steps 466, 468, 470 and 472 is executed to realize user registration and transmission of notification mail, and the process ends. If scanning is completed before the user enters necessary pieces of information and presses OK button, the determination at step 466 becomes NO and the determination at step 474 becomes YES. Consequently, at step 475, a screen corresponding to the user registration screen and additionally having a cancel button to instruct cancellation of user registration is displayed, and the control waits for the user input. If the cancel button is pressed, the screen is cleared at step 476, and the scanning process ends without user registration. If the OK button is pressed, the control proceeds to step 468, the user registration, transmission of notification mail and the like are executed in the similar manner as described above, and the document reading process ends.

(3) Uploading of a File from a Smart Phone

Assume that the user selects log-in to the cloud service, on a smart phone. The process shown in FIG. 14 is executed in the smart phone. First, the log-in process using log-in screen 530 shown in FIG. 15 takes place (step 490), the file list for uploading is formed based on the state of storage device of the smart phone, and the file list for downloading is formed based on the state of storage device in server 62 (step 492). Using these file lists, the file operation menu 550 shown in FIG. 16 is displayed (step 494). In the present embodiment, the menu displayed as a default at step 494 is the screen for file uploading, and none of the files is in the selected state. Upload button 574 is in a non-selectable state.

If the user selects a file, by the process of steps 496, 498 and 500 of FIG. 14, the selected file name is highlighted, and upload button 574 is made operable. If another file is selected, the same process is repeated, the highlight display of the file that has been selected previously is cancelled and the newly selected file is highlighted. Assume that after file selection, the user operates upload button 574 shown in FIG. 16 and thereby selects uploading of the file to server 62. Then, in the program shown in FIG. 14, the process of steps 496 and 510 is executed. At step 510, the selected file is transmitted to server 62.

In response to transmission of the file, in the server, the process shown in FIG. 17 is activated. Referring to FIG. 17, at step 590, the file from the smart phone is received, and the file is saved in the storage device (step 592). At step 594, the file is converted to print data, and at step 596, the converted print data is saved in association with the file that has been received from MFP 68 and saved. At step 598, a mail notifying completion of print data generation (see FIG. 18) is transmitted to the mail address of the smart phone user, and the process ends.

On the other hand, on the smart phone, through steps 512 and 514 of FIG. 14, the upload operation menu in the initial state is again formed and displayed, to wait for the next input. When the user presses log-out button 564 (FIG. 16), the control proceeds to step 522, at which the log-out process is executed and log-out from the cloud service is completed. On the screen of the smart phone, a normal standby screen is displayed.

(4) Printing of the Uploaded File by the MFP

When a file uploaded to server 62 by the smart phone is to be printed, the user conducts the following process on MFP 68. It is assumed that on operation display unit 100 of MFP 68, standby screen 130 shown in FIG. 3 is displayed.

The user presses cloud service button 146. Then, in MFP 68, the program having the control structure shown in FIG. 21 is activated. First, at step 680, a browser is activated in place of a native UI of MFP 68, to establish connection with server 62. Thereafter, the operation is the same as that of a common browser. Specifically, if there is a response from server 62 (YES at step 682), the process instructed by the response is executed (step 684), and if the instruction is to end the process (YES at step 686), the browser is closed and the normal display of operation display unit 100 is resumed.

If there is no instruction from server 62 at step 682, whether or not there is any input by the user on operation display unit 100 of MFP 68 is determined (step 690), and if there is any input (YES at step 690), a request in accordance with the request is transmitted to the server 62 (step 692), and the control returns to step 682. If there is no input (NO at step 690), the control returns to step 682 without any operation.

In this process, substantial processing is done entirely on the side of server 62 and, therefore, only the simple process takes place on the side of MFP 68 as shown above. At the start of this program, a log-in screen 750 shown in FIG. 23 is displayed on operation display unit 100.

On the other hand, if there is any input to log-in screen 750 from the browser of server 62, the log-in process of step 710 shown in FIG. 22 starts. When log-in is successful, a list of files saved in server 62 for the user is formed (steps 712), and an operation menu 780 (FIG. 24) using the file list is displayed (step 714). Here, none of the files in file list pane 790 is selected, and neither a print button 800 nor a document saving button 802 is selected. OK button 794 is inoperable. Thereafter, at step 716, the control waits for a user operation and, depending on the type of the operation, control flow branches.

Here, it is assumed that the user selects a process of printing a file that has been uploaded from the smart phone. Here, the operation proceeds such that the user selects any of the file names of file list pane 790 of operation menu 780 shown in FIG. 24, presses print button 800 and then presses OK button 794. Though the order of pressing print button 800 and selecting a file may be reversed, in the following, it is assumed that the file is selected first and then print button 800 is operated.

When any of the file names is selected first, step 718 of FIG. 22 is executed, and the file name is highlighted. Further, if print button 800 has already been selected, OK button 794 becomes operable at step 720. If print button 800 has not been selected, OK button 794 remains inoperable. Here, only the file is selected, and therefore, OK button 794 is inoperable. Thereafter, the control returns to step 716, and the control again waits for a user input.

According to the order of operation mentioned above, the user then presses print button 800. Then, in FIG. 22, the control proceeds to step 722, and the print button is highlighted. FIG. 25 shows this state. Then, the control proceeds to step 720. In this example, one of the files has already been selected and OK button 794 has been selected and, therefore, OK button 794 is operable, ready to receive the user input.

Assume that the user presses OK button 794 in accordance with the order of operation mentioned above. In the program shown in FIG. 22, the process steps 728, 730, 734 and 736 are executed. Specifically, at step 734, the program shown in FIG. 26 is activated, the designated file is downloaded from server 62 to MFP 68 (steps 820 and 822), and printed by MFP 68. Thereafter, the control returns to step 716, to wait for the next user input.

Though not described in detail here, in the document saving process, the user operation must follow such an order that server 62 executes steps 724 and 726, 728, 738 and 740 in this order.

If the user presses log-out button 796 (see FIG. 24), the process of step 742 shown in FIG. 22 is executed, the process of server 62 ends, and a print end menu 840 is displayed on operation display unit 100 of MFP 68 (FIG. 27).

The configurations and operations of various units and components of the system in accordance with the first embodiment have been described above. In accordance with the embodiment, when a file is printed by the MFP using the network print system, a screen urging registration for the cloud service of the network print system is displayed. Printing of a document takes some time. Conventionally, the user simply waits for the end of printing in front of the MFP or kills time therearound. According to the present embodiment, however, registration for the cloud service can be done utilizing this time period. Therefore, registration for the cloud service is not a bothersome procedure for the user but a simple work to fill up the time. As a result, reluctance to the registration for the cloud service is reduced, and popularity of the cloud service would be increased.

Further, according to the embodiment above, in the document scan process that does not normally require any communication with the server, registration for the cloud service can be done utilizing the time for scanning. As a result, reluctance to spend time for the registration for the cloud service is reduced, and popularity of the cloud service would be increased.

Second Embodiment

In the embodiment above, the user transmits document data to be printed from the smart phone to server 62 of the cloud service, and prints the print data generated by server 62 on MFP 68. Any user registered for the cloud service can print the print data using any MFP. However, since download of the print data is not started until the print data is requested from MFP 68, it takes some time until printing by MFP 68 actually starts. The second embodiment aims to reduce the wait time. Specifically, in the present embodiment, when generation of print data is requested from the MFP to the server, the MFP is set as a default printer for the user (in the present embodiment, this will be referred to as "MY PRINTER"). Thereafter, if the user uploads print data from, for example, a smart phone to the server, the converted print data is transmitted in advance to the MFP designated as MY PRINTER before the request for the data is received from the MFP. By the time the user prints the desired file using the MFP designated as MY PRINTER, printing can be started immediately without downloading the print data anew from the server.

In order to realize such a process, it is necessary that each of the MFPs has a unique identification number, for distinguishing from each other. The embodiment described below is on the premise that such conditions are satisfied.

[Configuration]

Hardware configurations of server, smart phone, MFP and the like are the same as those of the first embodiment, and the differences reside mainly in the programs executed by the server and the corresponding portions added to the programs of MFP and the like. In the following, the differences will be mainly described.

Figure 31:
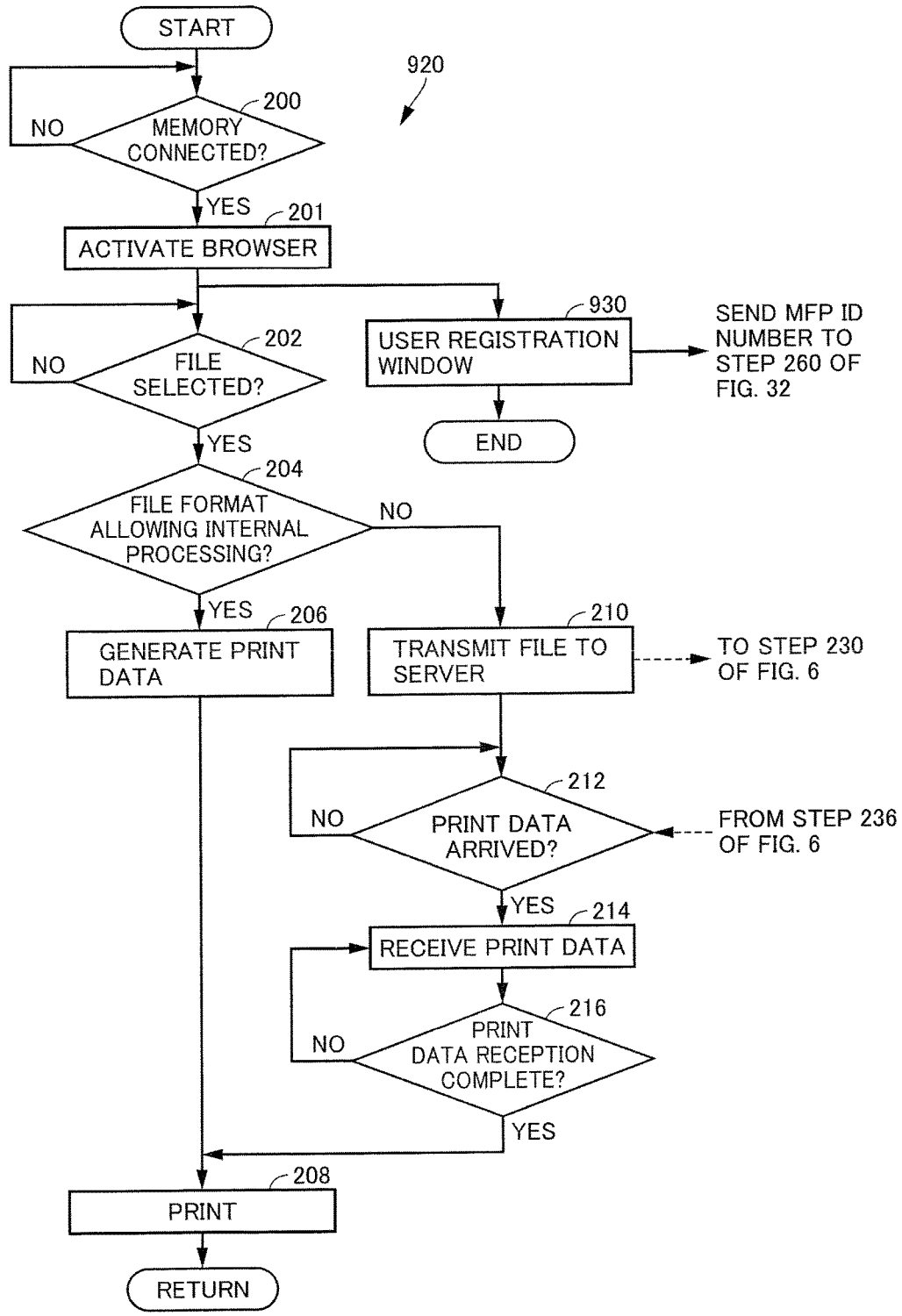
FIG. 31 is a flowchart representing a control structure of a program executed when the user selects printing of a file, in the MFP of the system in accordance with a second embodiment of the present invention.

FIG. 31 shows a control structure of a program executed when printing of a file by MFP 68 is selected in accordance with the present embodiment, corresponding to the program having the control structure shown in FIG. 5 in accordance with the first embodiment. FIG. 31 is different from FIG. 5 in that in place of step 218 of FIG. 5, it includes a step 930, executed if the user operates a registration start button 350 on a registration window 960 for user registration shown on the right half of a screen 950 of FIG. 33, of transmitting the identification number of MFP 68 operated by the user to server 62. Except for this point, the program is the same as that shown in FIG. 5 of the first embodiment.

An example of screen 950 displayed on operation display unit 100 of MFP 68 at step 201 is shown. The screen is similar to screen of FIG. 8, that is, screen 300 (see FIG. 8) displayed at step 202 of FIG. 5, and it includes file selection window 310 shown in FIG. 8, and a registration window 960 including a message 970 that more speedy printing becomes possible if the currently used MFP is registered as MY PRINTER, in place of registration window 312 shown in FIG. 8. Except for these points, screen 950 is the same as screen 300.

Figure 32:
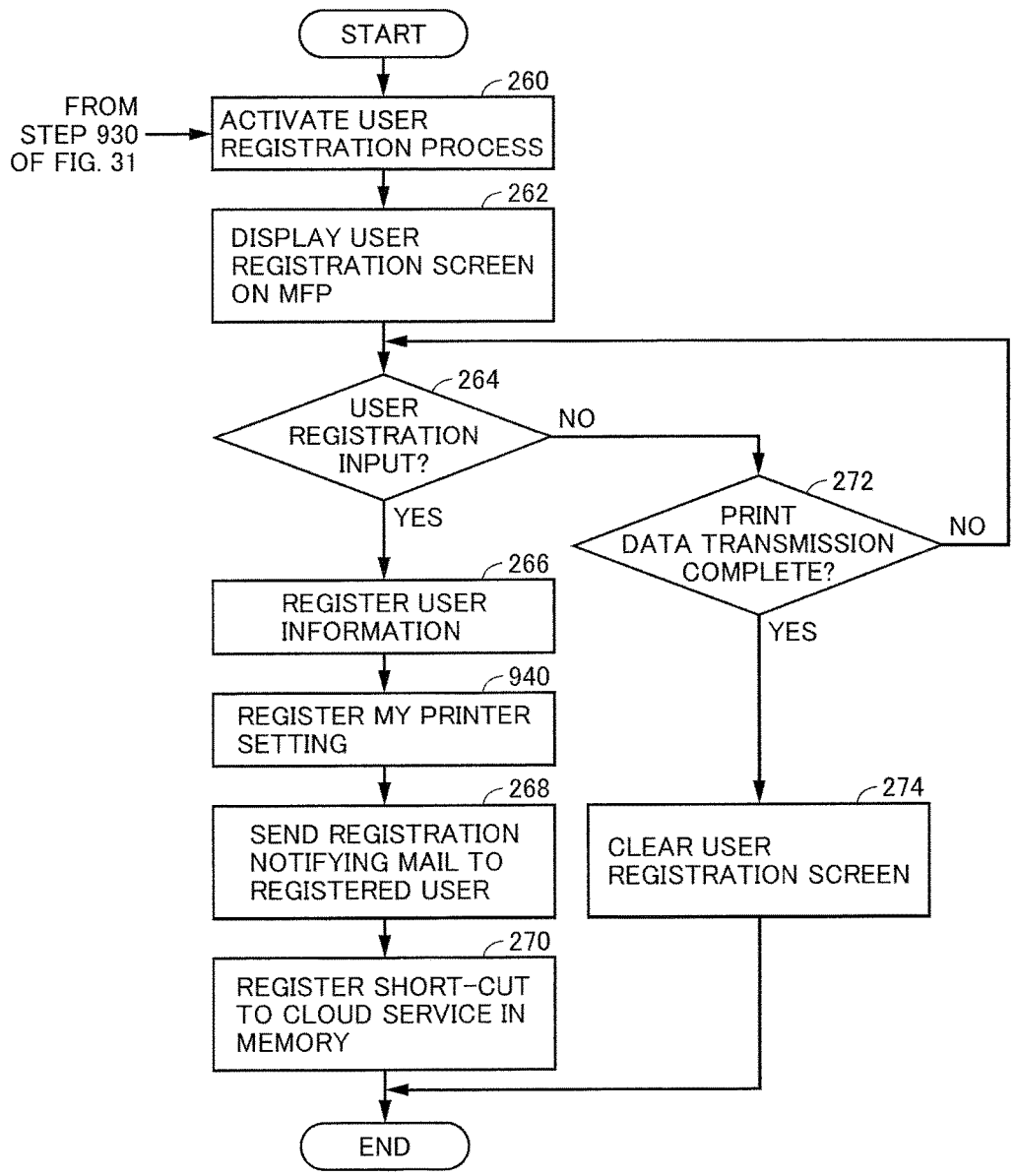
FIG. 32 is a flowchart representing a control structure of a program for user registration executed by the server.

On the other hand, of the programs running on the server in accordance with the present embodiment, in place of the one having the control structure shown in FIG. 7 of the first embodiment, a program having a control structure shown in FIG. 32 is used in the server of the system in accordance with the present embodiment. The program shown in FIG. 32 differs from that shown in FIG. 7 in the following points: when the user registration process is activated at step 260, the identification number of MFP is received together with the process activation request; and between steps 266 and 268, a step 940 of determining whether or not setting of the MFP to be MY PRINTER is instructed in the form transmitted with the activation request, and a step 942 of setting, if the determination at step 940 is positive, of setting the identification number of MFP transmitted with the activation request as MY PRINTER of the user, are newly added. If the determination at step 940 is negative, and after the end of step 942, the control proceeds to step 268. Except for these points, the program is the same as that shown in FIG. 7.

Figure 33:
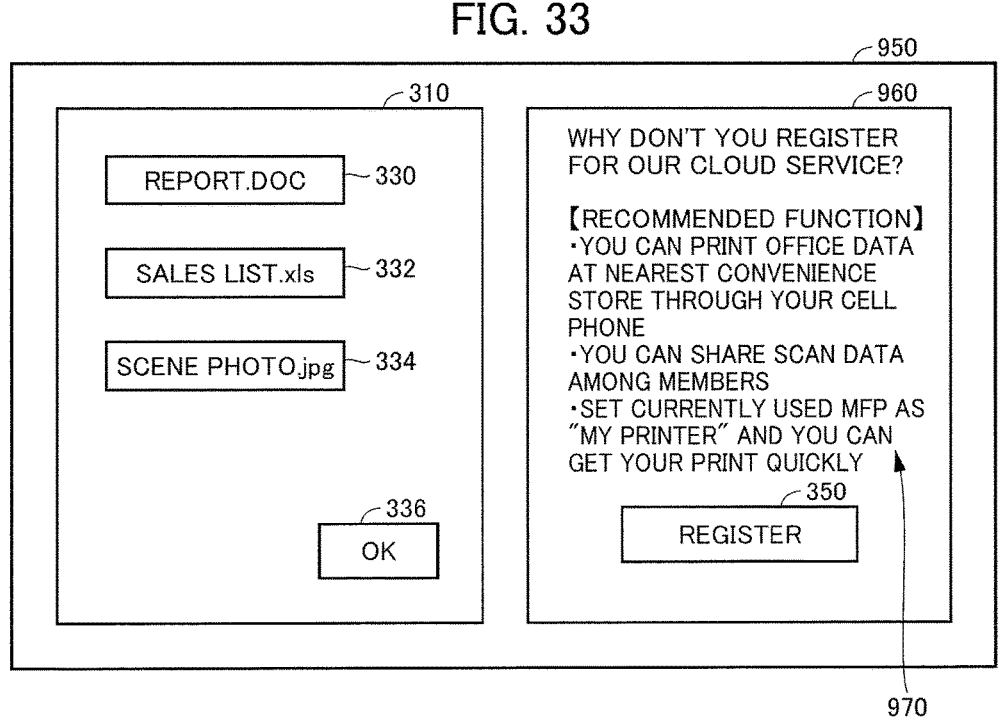
FIG. 33 schematically shows a screen urging registration for the cloud service, displayed by the MFP at the time of executing scanning.
Figure 34:
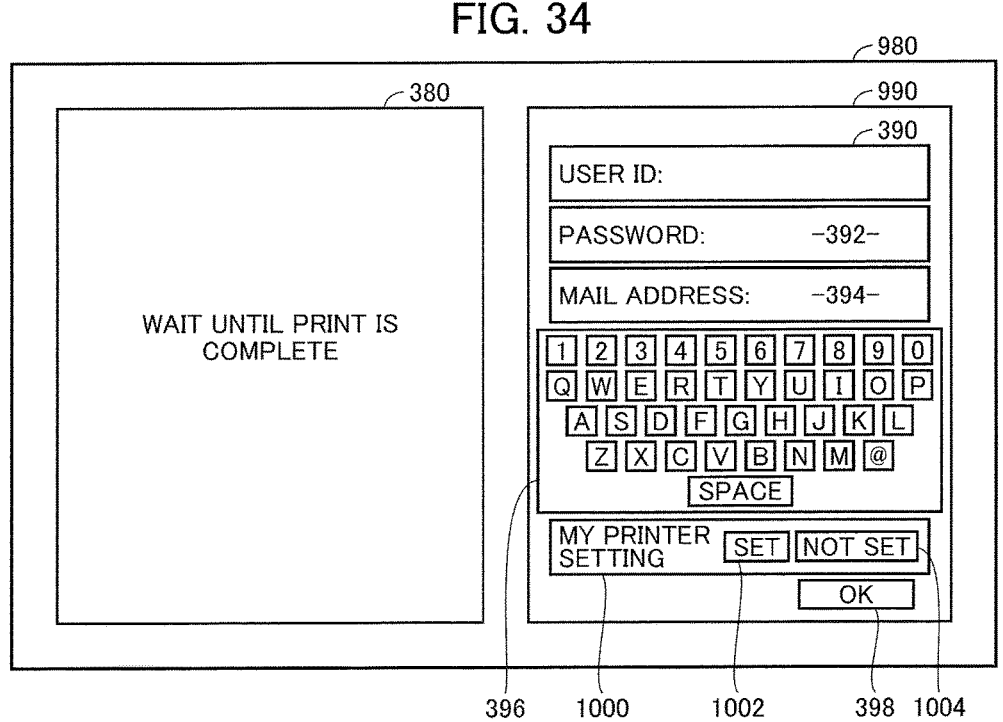
FIG. 34 schematically shows a screen displayed by the MFP when the user registration for the cloud service is started on the screen shown in FIG. 33.

FIG. 34 shows a screen 980 displayed on operation display unit 100 of MFP 68 when the user presses OK button 336 and registration start button 350 of FIG. 33, to start generation of the print data by the server and to start registration for the cloud service. Though screen 980 is similar to screen 300 shown in FIG. 9, it is different in that in place of user registration screen 382 shown on the right half of screen 300 shown in FIG. 9, it includes a user registration screen 990 additionally including a MY PRINTER setting box 1000 for setting whether or not currently used MFP 68 is to be registered as MY PRINTER of the user in the cloud service. Except for this point, screen 980 is the same as screen 300.

MY PRINTER setting box 1000 includes a text of "MY PRINTER SETTING" and radio buttons 1002 and 1004 for designating whether or not currently used MFP 68 is to be set as MY PRINTER of the user. Radio buttons 1002 and 1004 are adapted such that when one is selected, selection of the other is cancelled. User registration screen 990 is drawn by the browser as an HTML form, and the input by the user is transmitted as an HTTP request to the server.

Figure 35:
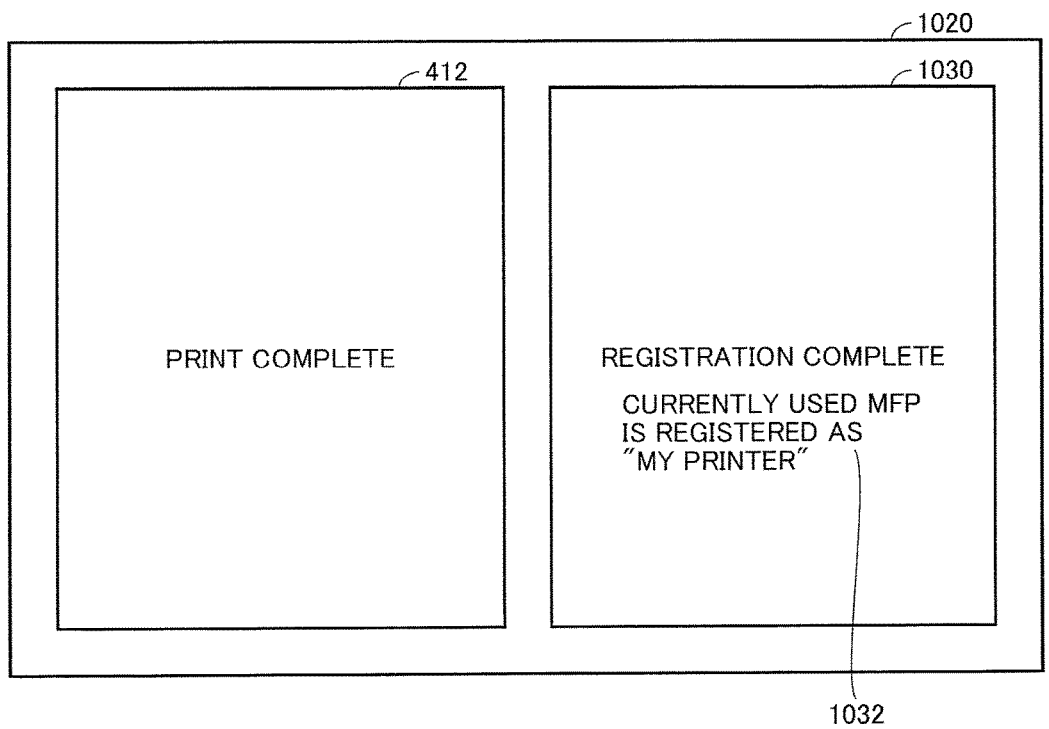
FIG. 35 schematically shows a screen displayed on the display device of the MFP when user registration is completed, in accordance with the second embodiment.

FIG. 35 shows a screen 1020 displayed on operation display unit 100 of MFP 68 when the printing and registration processes are completed. Screen 1020 is similar to screen 300 of FIG. 10 in accordance with the first embodiment. It is different, however, in that it includes a registration complete message 1030 including a message text indicating completion of registration and a MY PRINTER setting complete message 1032 displayed when setting of MY PRINTER is completed, in place of registration complete message 414 of FIG. 10.

Figure 36:
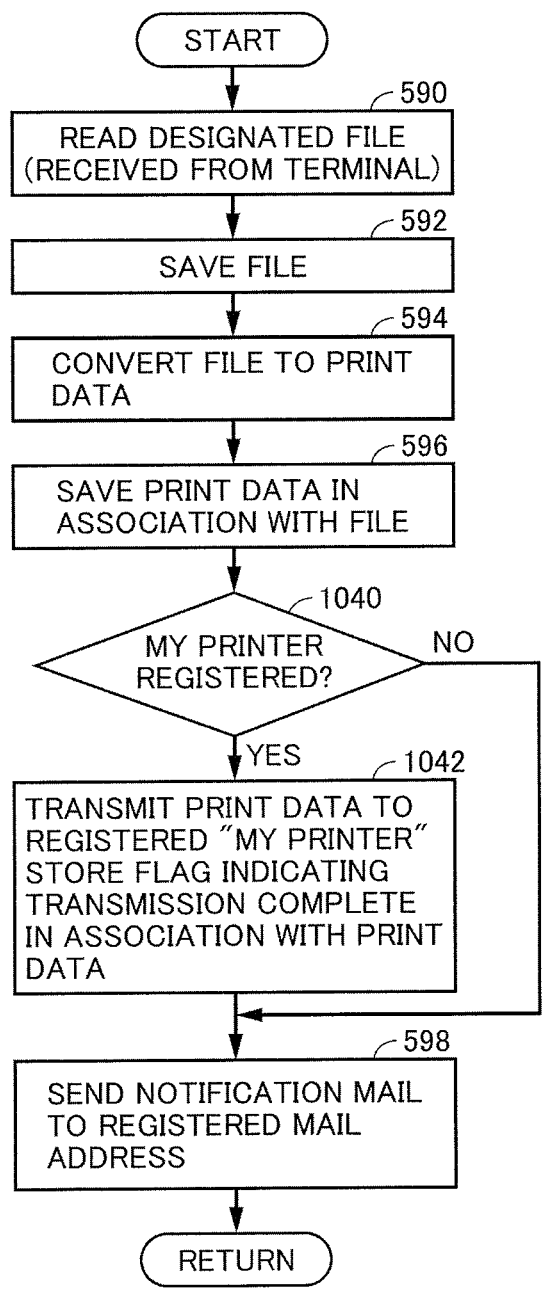
FIG. 36 is a flowchart representing a control structure of a program executed by the server for realizing the process for uploading a file to the server, in accordance with the second embodiment.

FIG. 36 is a flowchart representing a control structure of a program, used in the system in accordance with the second embodiment in place of the program having the control structure shown in FIG. 17 of the first embodiment, executed on the side of the server for realizing the process of uploading a file to the server and printing as well as the process for transmitting the print data to the MFP registered as MY PRINTER in advance, for the user having registered MY PRINTER.

The program shown in FIG. 36 differs from the program of FIG. 17 in that it includes, between steps 596 and 598 of FIG. 17, a step 1040 of determining whether or not MY PRINTER is set for the user, and proceeding to step 598 if it is not set, and a step 1042, executed if it is determined at step 1040 that MY PRINTER is set, of transmitting the print data to the MFP registered as MY PRINTER, and setting on a flag (transmission complete flag) indicating that the print data has already been transmitted. After step 1042, the control proceeds to step 598. The process following step 598 is the same as that shown in FIG. 17.

Figure 37:
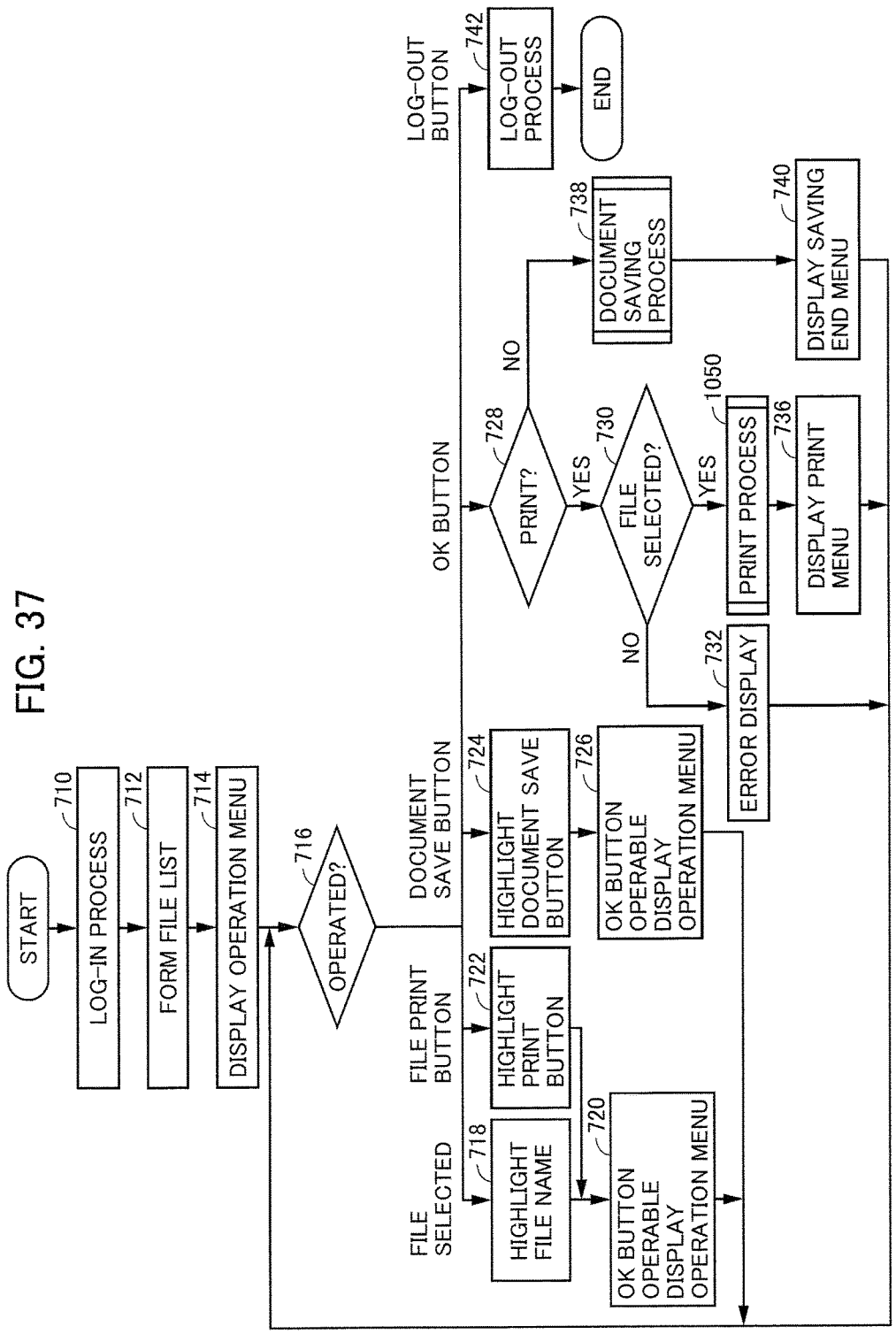
FIG. 37 is a flowchart representing a control structure of a program executed by the server, for providing the cloud service to the user of MFP, in accordance with the second embodiment.

FIG. 37 is a flowchart representing a control structure of a program used in the system in accordance with the second embodiment used in place of the program having the control structure shown in FIG. 22 of the first embodiment, executed by the server for providing the cloud service for the user of MFP. The program shown in FIG. 22 is different from that of FIG. 22 in that it includes, in place of step 734 shown in FIG. 22, a step 1050 for performing a process in consideration of MY PRINTER. Except for this point, FIG. 37 is the same as FIG. 22.

Figure 38:
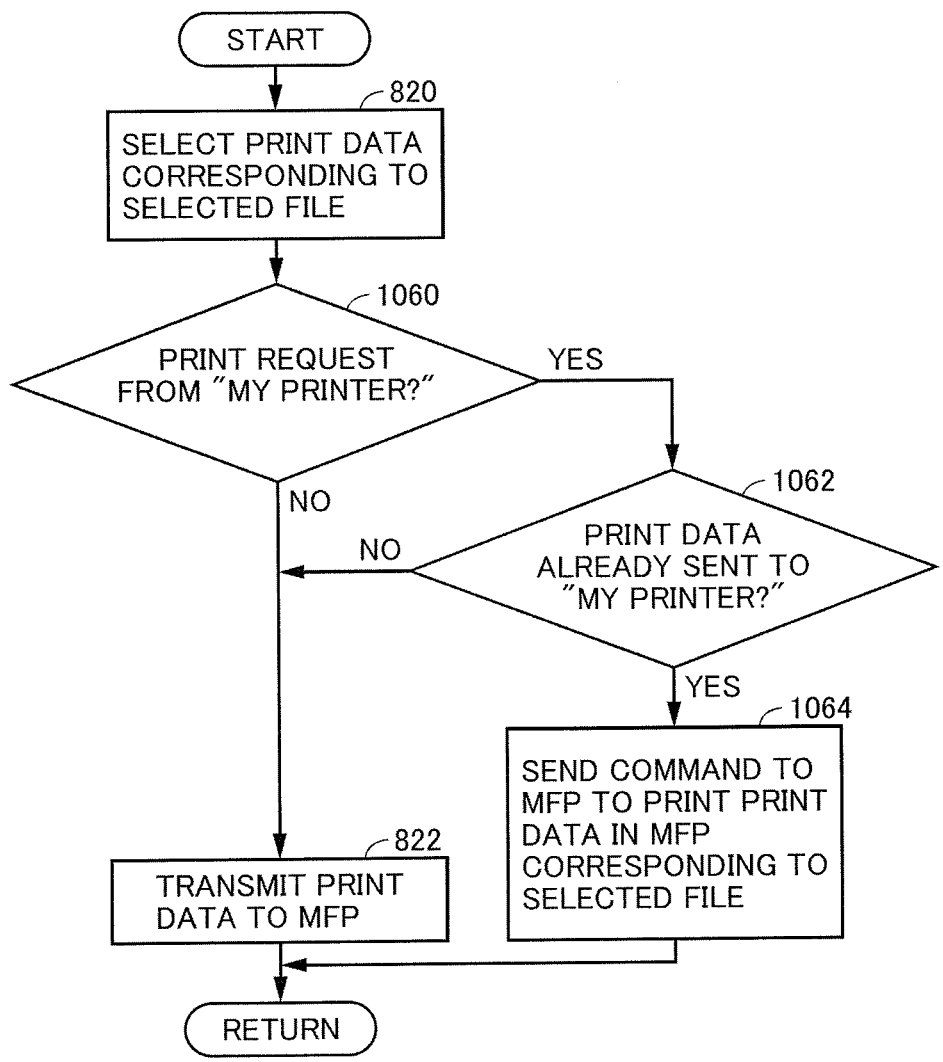
FIG. 38 is a flowchart representing a control structure of a program executed by the server when a request for printing a file is received from the MFP, in accordance with the second embodiment.

FIG. 38 is a flow chart representing details of step 1050 shown in FIG. 37. FIG. 38 is used in the system in accordance with the second embodiment in place of the program having the control structure shown in FIG. 26 of the first embodiment. The flowchart shown in FIG. 38 is different from the flowchart of FIG. 26 in that it additionally includes, between steps 820 and 822, a step 1060 of determining whether or not the print request is a print request from the MFP registered as MY PRINTER for the user and proceeding to step 822 if the result of determination is negative, a step 1062, executed if the determination at step 1060 is positive, of determining whether or not the print data corresponding to the designated file has already been transmitted (whether or not the transmission complete flag is on) to the MFP registered as MY PRINTER for the user, and proceeding to step 822 if not, and a step 1064, executed if the determination at step 1062 is positive, of transmitting to the MFP a command instructing the MFP to read the print data corresponding to the selected file from the inside of MFP and execute printing, and ending the process.

The result of determination at step 1060 is positive if the user who has transmitted the print request has registered MY PRINTER and the identification number of the registered MFP matches the identification number of the MFP that transmitted the print request, and it is negative otherwise.

[Operation]

The second embodiment is different from the first embodiment in that MY PRINTER can be set. At the time of using, for example, the print service, registration window 960 such as shown on the right half of FIG. 33 is displayed, and when user registration is selected, MY PRINTER setting box 1000 such as shown in FIG. 34 is displayed. If radio button 1002 is selected on MY PRINTER setting box 1000, at the execution of the program shown in FIG. 32, the currently used MFP is set as MY PRINTER of the user through the process of steps 940 and 942, in addition to the user registration of step 266. If setting of MY PRINTER is not designated, only the user registration will be executed.

Thereafter, if the user uploads a file from the smart phone to server 62, for example, execution of the program shown in FIG. 36 starts, and if the MFP is registered as MY PRINTER for the user (YES at step 1040), the print data generated from the uploaded file is transmitted to the MFP at step 1042 without waiting for a request from the user. If MY PRINTER is not registered, the print data is not transmitted.

Thereafter, if the user selects the cloud service by the MFP, execution of the program having the control structure shown in FIG. 37 starts. Through process steps 710, 712 and 714, the user designates an uploaded file (steps 716, 718, 720), presses the file print button (steps 716, 718, 720) and presses the OK button, and then, through steps 728 and 730 of FIG. 37, the process of step 1050 is activated.

At step 1050, the program shown in FIG. 38 operates. The print data of the designated file is read (step 820), and determination is made as to whether the print request is from the MFP registered as MY PRINTER for the user (step 1060). If setting of MY PRINTER is not done, or the identification number of the MFP from which the request has been transmitted is different from the identification number of the MFP registered as MY PRINTER, the print data is transmitted at step 822 to the MFP that transmitted the print request, and the process ends.

If the print request is from the MFP registered as MY PRINTER, whether or not the print data of the designated file has already been transmitted to the MFP is further determined. The determination can be done by checking the value of transmission complete flag, related to the file. If the data has already been transmitted, re-transmission is not done, and a command for printing the print data already saved in the MFP is sent to the MFP (step 1064), and the process ends. If the data has not yet been transmitted, the print data is transmitted at step 822 to be printed by the MFP.

In this manner, if the print data corresponding to the designated file has already been transmitted to the MFP registered as MY PRINTER and the print request comes from the MFP, it is unnecessary to execute the process of transmitting the print data of step 822. The MFP can immediately start printing using the stored print data. The time from when the user transmits the print request to the server until printing by the MFP starts can considerably be reduced than when MY PRINTER is not registered.

Thus, in the second embodiment, in addition to the advantage that spare time can be used for registration for the cloud service, the advantage provided by the cloud service itself can be emphasized, strongly motivating the user to register for the cloud service. As a result, popularity of the cloud service would further be increased.

Both in the first and second embodiments, user registration for the cloud service is possible using operation display unit 100 of the MFP. For the user registration related to the cloud service, it is unnecessary for the user to search for a specific web page for user registration or to enter a specific URL on his/her own PC. User registration for the cloud service can easily be done using the MFP used for image formation. Further, when the user starts a process other than the user registration process, such as printing of a file utilizing the print service by the server, on the MFP, the user registration process starts. It is unnecessary for the user to intentionally start the user registration process. The user registration can be done effectively utilizing the spare time during file printing.

When a document is read using the scanner function of the MFP, if the ADF function of the scanner is used, the user comes to have some spare time while the document is being read. As the user registration process can be executed utilizing the spare time, the user can complete user registration for using the service, effectively utilizing the spare time.

Further, in response to completion of user registration, a short-cut for assisting access to the service is registered in external storage device 106 connected to external storage device connecting unit 104. When accessing the service next time, the user can use the short-cut, and the cloud service can be used more easily.

Further, among the users of MFP 68, some users simply take copies and are not likely to use services provided by a remote server. Therefore, of the functions provided by MFP 68, if a function often used by a user who is likely to use such service (for example, print service by the server) is executed, the user registration process is started, and if a function often used by a user who is not likely to use the server service (for example, simple copy operation) is executed, the user registration process is not started. By such an approach, an appropriate guidance for user registration for the cloud service can be presented while an unwanted guidance is not given.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. A multifunctional image forming apparatus, comprising:
   communication circuitry configured to enable a registered user to communicate with a server providing a service related to image formation;
   a display operation device having a display device, for receiving a user operation; and
   image processing circuitry configured to execute image processing in response to a user instruction received through said display operation device;
   wherein
     a user registration process for the service provided by said server is started by a prescribed user operation;
     in response to a first user input operation received through said display operation device, the display device:
       displays a user registration process reception screen in accordance with data received from said server through communication with said server via said communication circuitry, and
       displays, in parallel with said user registration process reception screen, a reception screen for receiving an instruction to execute image processing,
     said reception screen includes a button for instructing registration of said multi-functional image forming apparatus as a default printer for said user;
   said display device further:
     receives a second input operation of user information by said user through said display operation device, and
     in response to an operation of said button by said user through said display operation device, transmits identification information of said multi-functional image forming apparatus and said user information to said server through said communication circuitry and causes said server to store said identification information and said user information in association with each other, and thereby registers said multi-functional image forming apparatus as said default printer.

2. The multifunctional image forming apparatus according to claim 1, wherein
   said image processing circuitry is capable of executing a plurality of image processing operations including at least an image scanning process and an image forming process,
   said scanning process involving scanning of a document and generating image data, and
   said image forming process involving forming of an image on a recording medium based on the image data; and
   said reception screen for receiving an instruction to execute an image processing is configured to selectively receive either an instruction of said scanning process or an instruction relating to said image forming process.

3. The multifunctional image forming apparatus according to claim 1, wherein in accordance with an instruction to execute image processing, said image processing circuitry is configured to execute image processing in parallel with the user registration process.

4. The multifunctional image forming apparatus according to claim 1, wherein
   said display device is configured to display, in parallel, both a state of image processing executed by said image processing circuitry in accordance with an instruction to execute image processing, and the user registration process reception screen.

5. A control method for controlling a multifunctional image forming apparatus, including a communication device, a display operation device and an image processing device, comprising the steps of:
   allowing a registered user to communicate with a server providing a service related to image formation, through said communication device;
   displaying a screen image and thereby receiving a user operation through said display operation device;
   performing image processing by said image processing device in response to a user instruction received at said step of receiving said user operation; and
   executing a user registration process for said service provided by said server; wherein
     said user registration process is started by a prescribed user operation; and
   said step of executing a user registration process includes:
     in response to a first user input operation received at said step of receiving said user operation, displaying on said display operation device a user registration process reception screen in accordance with data received from said server through communication with said server at said step of allowing communication, and
     displaying, on said display operation device, a reception screen for receiving an instruction to execute image processing, in parallel with said user registration process reception screen, wherein said reception screen includes a button for instructing registration of said multi-functional image forming apparatus as a default printer for said user, receiving, at said display operation device, input of user information by said user, and in response to an operation of said button by said user through said display operation device, transmitting identification information of said multi-functional image forming apparatus and said user information to said server through said communication device and causing said server to store said identification information and said user information in association with each other, and thereby registering said multi-functional image forming apparatus as said default printer.

6. The control method according to claim 5, wherein said image processing device is configured to execute a plurality of image processing operations including at least an image scanning process and an image forming process, said scanning process involving scanning of a document and generating image data, and said image forming process involving forming of an image on a recording medium based on the image data;

said method further comprising:

receiving, via said reception screen, an instruction to execute image processing receiving either an instruction of said scanning process or said image forming process.

7. The control method according to claim 5, further comprising the step of executing, in accordance with an instruction to execute image processing, image processing by said image processing device in parallel with the user registration process.

8. The control method according to claim 5, further comprising the step of displaying a state of image processing executed by said image processing device in accordance with an instruction to execute image processing, in parallel with the user registration process reception screen.

* * * * *